(12) United States Patent
Mikami et al.

(10) Patent No.: US 11,038,597 B2
(45) Date of Patent: Jun. 15, 2021

(54) COMMUNICATION SYSTEM AND COMMUNICATION APPARATUS

(71) Applicant: FUJITSU LIMITED, Kawasaki (JP)

(72) Inventors: Kazumasa Mikami, Yokohama (JP); Junichi Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/014,856

(22) Filed: Sep. 8, 2020

(65) Prior Publication Data
US 2021/0075515 A1 Mar. 11, 2021

(30) Foreign Application Priority Data
Sep. 10, 2019 (JP) .............................. JP2019-164929

(51) Int. Cl.
*H04B 10/516* (2013.01)
*H04B 10/69* (2013.01)
*H04L 1/00* (2006.01)

(52) U.S. Cl.
CPC ....... *H04B 10/5161* (2013.01); *H04B 10/695* (2013.01); *H04L 1/0052* (2013.01); *H04L 1/0071* (2013.01)

(58) Field of Classification Search
None
See application file for complete search history.

(56) References Cited

U.S. PATENT DOCUMENTS

| 2002/0023247 A1* | 2/2002 | Akiyama | H04L 1/006 714/758 |
| 2008/0163025 A1 | 7/2008 | Djordjevic et al. | |
| 2020/0044770 A1* | 2/2020 | Lefevre | H04J 1/045 |

(Continued)

FOREIGN PATENT DOCUMENTS

| JP | 2008-187706 A | 8/2008 | |
| WO | WO-2008147139 A2 * | 12/2008 | .......... H04L 1/0065 |

OTHER PUBLICATIONS

Fred Buchali et al., "Rate Adaptation and Reach Increase by Probabilistically Shaped 64-QAM: An Experimental Demonstration", Journal of Lightwave Technology, vol. 34, No. 7, pp. 1599-1609, Apr. 1, 2016 (Total 11 pages).

(Continued)

*Primary Examiner* — David W Lambert
(74) *Attorney, Agent, or Firm* — Fujitsu Patent Center

(57) ABSTRACT

An optical communication system includes a first communication device configured to transmit optical signals, and a second communication device configured to receive the optical signals. The first transmission device includes encoding circuit that configured to assign, to a plurality of bit strings, symbols each corresponding to a value of every one of the plurality of bit strings, the symbols being among a plurality of symbols in a constellation of a multi-level modulation scheme, convert values of bit strings, generate the second error correction code from a second bit string among the plurality of bit strings in every one of a plurality of periods, delay the first error correction code, and delay the second error correction code, wherein the encoding circuit uses the delayed first error correction code and the delayed second error correction code to convert a value of the second bit string.

8 Claims, 21 Drawing Sheets

(56) References Cited

U.S. PATENT DOCUMENTS

2020/0244286 A1* 7/2020 Kubo ................ H03M 13/3723

OTHER PUBLICATIONS

Udo Wachsmann et al., "Multilevel Codes: Theoretical Concepts and Practical Design Rules", IEEE Transactions on Information Theory, vol. 45, No. 5, pp. 1361-1391, Jul. 1999 (Total 31 pages).
Andreas Bisplinghoff et al., "Low-Power, Phase-Slip Tolerant, Multilevel Coding for M-QAM", Journal of Lghtwave Technology, vol. 35, No. 4, pp. 1006-1014, Feb. 15, 2017 (Total 9 pages).
Yohei Koganei et al., "Multilevel Coding with Spatially-Coupled Codes for beyond 400Gbps Optical Transmission", OFC 2018, Tu3C.2, Optical Society of America, Mar. 2018 (Total 3 pages).

* cited by examiner

FIG. 5

BEFORE PROBABILISTIC SHAPING

| SECOND QUADRANT | FIRST QUADRANT |
|---|---|
| ○ ○ ○ ○<br>P41 P31 P21 P11 | |
| ○ ○ ○ ○<br>P42 P32 P22 P12 | |
| ○ ○ ○ ○<br>P43 P33 P23 P13 | |
| ○ ○ ○ ○<br>P44 P34 P24 P14 | |
| THIRD QUADRANT | FOURTH QUADRANT |

↓

AFTER PROBABILISTIC SHAPING

| SECOND QUADRANT | FIRST QUADRANT |
|---|---|
| ○ ○ ○ ○<br>P41 P31 P21 P11 | |
| ○ ◯ ◯ ○<br>P42 P32 P22 P12 | |
| ○ ◯ ○ ○<br>P43 P33 P23 P13 | |
| ○ ○ ○ ○<br>P44 P34 P24 P14 | |
| THIRD QUADRANT | FOURTH QUADRANT |

FIG. 6

| Q VALUE | | |
|---|---|---|
| LEVEL-2 | LEVEL-1 | LEVEL-0 |
| 0 | 0 | 0 |
| 0 | 0 | 1 |
| 0 | 1 | 1 |
| 0 | 1 | 0 |
| 1 | 1 | 0 |
| 1 | 1 | 1 |
| 1 | 0 | 1 |
| 1 | 0 | 0 |

SECOND QUADRANT | FIRST QUADRANT

THIRD QUADRANT | FOURTH QUADRANT

| | I VALUE | | | | | | | | |
|---|---|---|---|---|---|---|---|---|---|
| LEVEL-2 | | 1 | 1 | 1 | 1 | 0 | 0 | 0 | 0 |
| LEVEL-1 | | 0 | 0 | 1 | 1 | 1 | 1 | 0 | 0 |
| LEVEL-0 | | 0 | 1 | 1 | 0 | 0 | 1 | 1 | 0 |

FIG. 10A

| Q VALUE | | | SECOND QUADRANT | | | | FIRST QUADRANT | | | |
|---|---|---|---|---|---|---|---|---|---|---|
| LEVEL-2 | LEVEL-1 | LEVEL-0 | | | | | | | | |
| 0 | 0 | 0 | ○ | ○ | ○ | ○ | ○ | ○ | ○ | ○ |
| 0 | 0 | 1 | ○ | ○ | ○ | ○ | ○ | ○ | ○ | ○ |
| 0 | 1 | 0 | ○ | ○ | ○ | ○ | ○ | ○ | ○ | ○ |
| 0 | 1 | 1 | ○ | ○ | ○ | ○ | ○ | ○ | ○ | ○ |
| 1 | 1 | 0 | ○ | ○ | ○ | ○ | ○ | ○ | ○ | ○ |
| 1 | 1 | 1 | ○ | ○ | ○ | ○ | ○ | ○ | ○ | ○ |
| 1 | 0 | 0 | ○ | ○ | ○ | ○ | ○ | ○ | ○ | ○ |
| 1 | 0 | 1 | ○ | ○ | ○ | ○ | ○ | ○ | ○ | ○ |

| | | THIRD QUADRANT | | | | FOURTH QUADRANT | | | |
|---|---|---|---|---|---|---|---|---|---|
| | LEVEL-2 | 1 | 1 | 1 | 1 | 0 | 0 | 0 | 0 |
| I VALUE | LEVEL-1 | 0 | 0 | 1 | 1 | 1 | 1 | 0 | 0 |
| | LEVEL-0 | 1 | 0 | 1 | 0 | 1 | 0 | 1 | 0 |

COMMUNICATION SYSTEM AND COMMUNICATION APPARATUS

CROSS-REFERENCE TO RELATED APPLICATION

This application is based upon and claims the benefit of priority of the prior Japanese Patent Application No. 2019-164929, filed on Sep. 10, 2019, the entire contents of which are incorporated herein by reference.

FIELD

The embodiments discussed herein are related to an encoding circuit, a decoding circuit, an encoding method, a decoding method, a transmission device, and an optical transmission system.

BACKGROUND

With the increase in the transmission capacity of the optical transmission device, for example, multi-level modulation schemes are used such as quadrature phase shift keying (QPSK), 16 quadrature amplitude modulation (16QAM), and 64QAM. In the multi-level modulation schemes, among symbols arranged in a constellation, a symbol corresponding to a value of each bit string in a frame signal to be modulated is assigned to a bit string, whereby an optical signal is generated having a phase and intensity in accordance with the symbol.

Probabilistic shaping (PS) technology (hereinafter referred to as "PS") forms a probability distribution of symbol assignment by converting the value of the bit string so that a symbol closer to the center of the constellation is assigned more. The noise tolerance is therefore improved of the signal light generated from the frame.

For the PS, for example, distribution matching (DM) processing is used for increasing the mark rate of the bit string to a rate greater than 50(%) (for example, 80(%)). The probability of symbol assignment is therefore biased toward the center of the constellation only in a specific quadrant among the first to fourth quadrants that divide the constellation. Thereafter, a quadrant in which the symbol to be assigned is located is determined from the first to fourth quadrants.

In determination of the quadrant, a parity bit of an error correction code such as forward error correction (FEC) may be used (for example, see Non-Patent Document that is F. Buchali, et al., "Rate Adaptation and Reach Increase by Probabilistically Shaped 64-QAM: An Experimental Demonstration", *JOURNAL OF LIGHTWAVE TECHNOLOGY*, VOL., 34, NO. 7, Apr. 1, 2016). Since the mark rate of the error correction code is maintained close to 50(%), the first to fourth quadrants are selected with substantially the same probability, and a probability distribution biased toward the center of the constellation is formed over all quadrants.

Examples of the error correction code encoding method include, for example, bit-interleaved coded modulation (BICM) and multilevel coding (MLC) (for example, see Patent Document and Non-Patent Documents, the patent document is Japanese Laid-open Patent Publication No. 2008-187706, the Non-patent Documents are U. Wachsmann, et al., "Multilevel Codes: Theoretical Concepts and Practical Design Rules", *IEEE TRANSACTIONS ON INFORMA TION THEORY*, VOL 45, NO. 5, July 1999, A. Bisplinghoff, et al., "Low-Power, Phase-Slip Tolerant, Multilevel Coding for M-QAM", *JOURNAL OF LIGHTWAVE TECHNOLOGY*, VOL., 35, NO. 4, Feb. 15, 2017, and Y. Koganei, et al., "Multilevel Coding with Spatially-Coupled Codes for beyond 400 Gbps Optical Transmission", OK, 2018, Tu3C.2). The BICM is an encoding method that collectively encodes each bit string without discrimination by level (most significant bit (MSB) or least significant bit (LSB)). The MLC is an encoding method that divides bit strings for respective levels and individually generates error correction codes.

SUMMARY

According to an aspect of the embodiments, an optical communication system comprising a first communication device configured to transmit optical signals and a second communication device configured to receive the optical signals, wherein the first transmission device includes an encoding circuit configured to assign, to a plurality of bit strings, symbols each corresponding to a value of every one of the plurality of bit strings, the symbols being among a plurality of symbols in a constellation of a multi-level modulation scheme, convert values of bit strings that are among the plurality of bit strings and other than a first bit string to cause a symbol that is among the plurality of symbols and closer to a center of the constellation to be assigned more, generate a first error correction code from the plurality of bit strings for each of frames, generate a second error correction code from a second bit string among the plurality of bit strings in every one of a plurality of periods that divide a period of a frame, delay the first error correction code and inserts the first error correction code into the first bit string in a frame subsequent to the frame, and delay the second error correction code and inserts the second error correction code into the first bit string in a period that is later than a period of the second bit string used to generate the second error correction code, the periods being among the plurality of periods, wherein the encoding circuit uses the delayed first error correction code and the delayed second error correction code to convert a value of the second bit string.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of processing of PS;

FIG. 6 is a diagram illustrating an example of symbol mapping;

FIG. 10A is a diagram illustrating another example of the symbol mapping;

DESCRIPTION OF EMBODIMENTS

Figure 1:
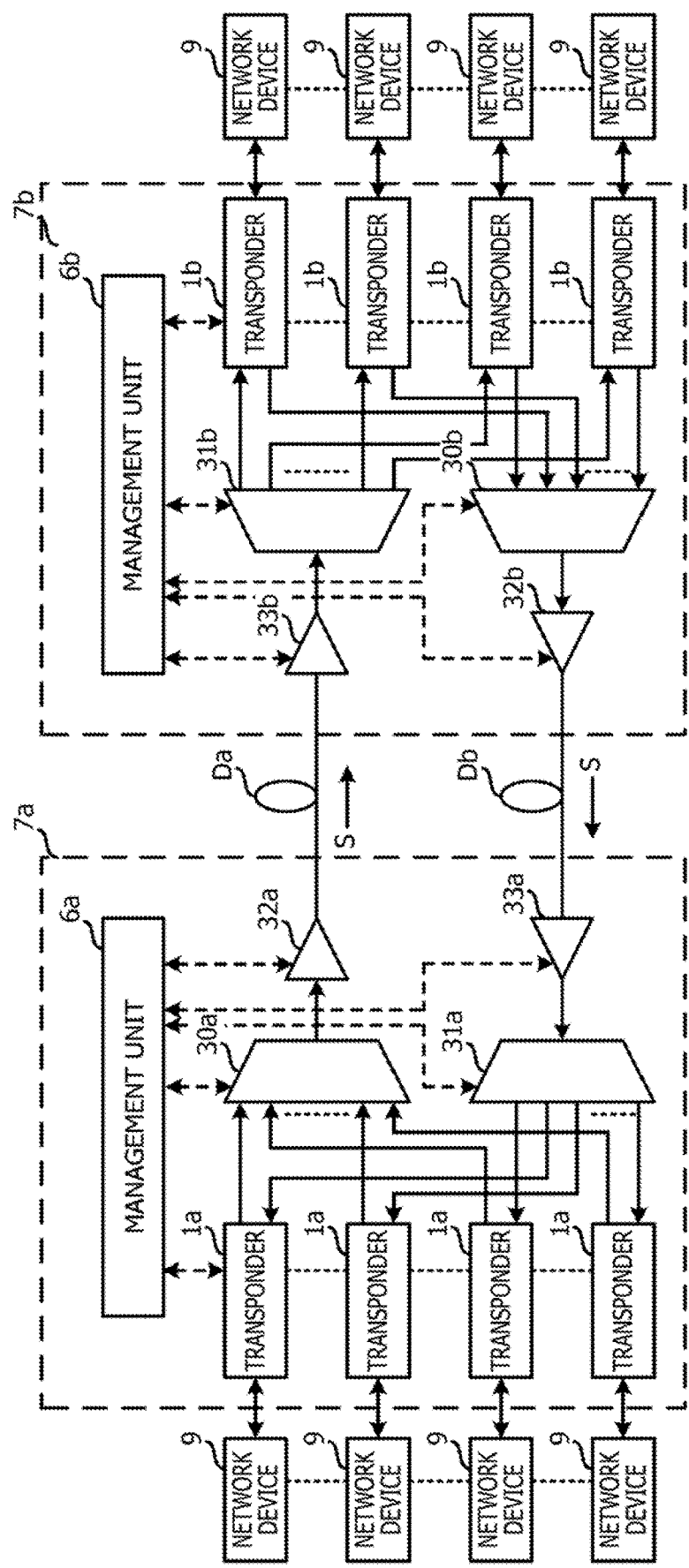
FIG. 1 is a configuration diagram illustrating an example of an optical transmission system.

FIG. 1 is a configuration diagram illustrating an example of an optical transmission system. The optical transmission system includes a pair of wavelength multiplexing optical transmission devices 7a and 7b connected to each other via transmission lines Da and Db such as optical fibers. The wavelength multiplexing optical transmission devices 7a and 7b mutually transmit and receive wavelength multiplexed optical signals S in which a plurality of optical signals having respective different wavelengths is subjected to wavelength multiplexing.

The wavelength multiplexing optical transmission device 7a includes a plurality of transponders 1a, an optical multiplexing unit 30a, an optical demultiplexing unit 31a, optical amplifiers 32a and 33a, and a management unit 6a. Furthermore, the wavelength multiplexing optical transmission device 7b includes a plurality of transponders 1b, an optical multiplexing unit 30b, an optical demultiplexing unit 31b, optical amplifiers 32b and 33b, and a management unit 6b.

The transponders 1a and 1b are examples of first and second transmission devices, respectively, and transmit and receive optical signals. The optical signals have, for example, an OTUCn frame format defined in ITU-T Recommendation G.709.

The transponders 1a and 1b are connected to network (NW) devices 9 such as routers on the client network side. The transponders 1a and 1b transmit and receive a plurality of client signals to and from the network devices 9. The transponders 1a and 1b store the plurality of client signals from the network devices 9 in a common frame and output the signals to the optical multiplexing units 30a and 30b, and extract the plurality of client signals from the frame from the optical demultiplexing units 31a and 31b to transmit the signals to the network devices 9.

The optical multiplexing units 30a and 30b are, for example, optical selection switches or optical filters, and perform wavelength multiplexing on optical signals input from the plurality of transponders 1a and 1b to obtain the wavelength multiplexed optical signals S, and output the wavelength multiplexed optical signals S to the optical amplifiers 32a and 32b. The optical amplifiers 32a and 32b amplify the wavelength multiplexed optical signals S and output the amplified wavelength multiplexed optical signals S to the transmission lines Da and Db.

The wavelength multiplexed optical signals S are input from the transmission lines Da and Db to the optical amplifiers 33a and 33b. The optical amplifiers 33a and 33b amplify the wavelength multiplexed optical signals S and output the amplified wavelength multiplexed optical signals S to the optical demultiplexing units 31a and 31b.

The optical demultiplexing units 31a and 31b are, for example, optical selection switches or optical filters, and separate the wavelength multiplexed optical signals S into optical signals of respective wavelengths. The optical signals are input from the optical demultiplexing units 31a and 31b to the plurality of transponders 1a and 1b.

The management units 6a and 6b are, for example, circuits including a processor such as a central processing unit (CPU), and control the wavelength multiplexing optical transmission devices 7a and 7b. The management units 6a and 6b, for example, set gains for the optical amplifiers 32a and 32b, and set wavelength multiplexing target frames for the optical multiplexing units 30a and 30b. Furthermore, the management units 6a and 6b, for example, set optical signals to be separated by the optical demultiplexing units 31a and 31b, and perform settings related to storing of the client signals in the frame by the transponders 1a and 1b.

Figure 2:
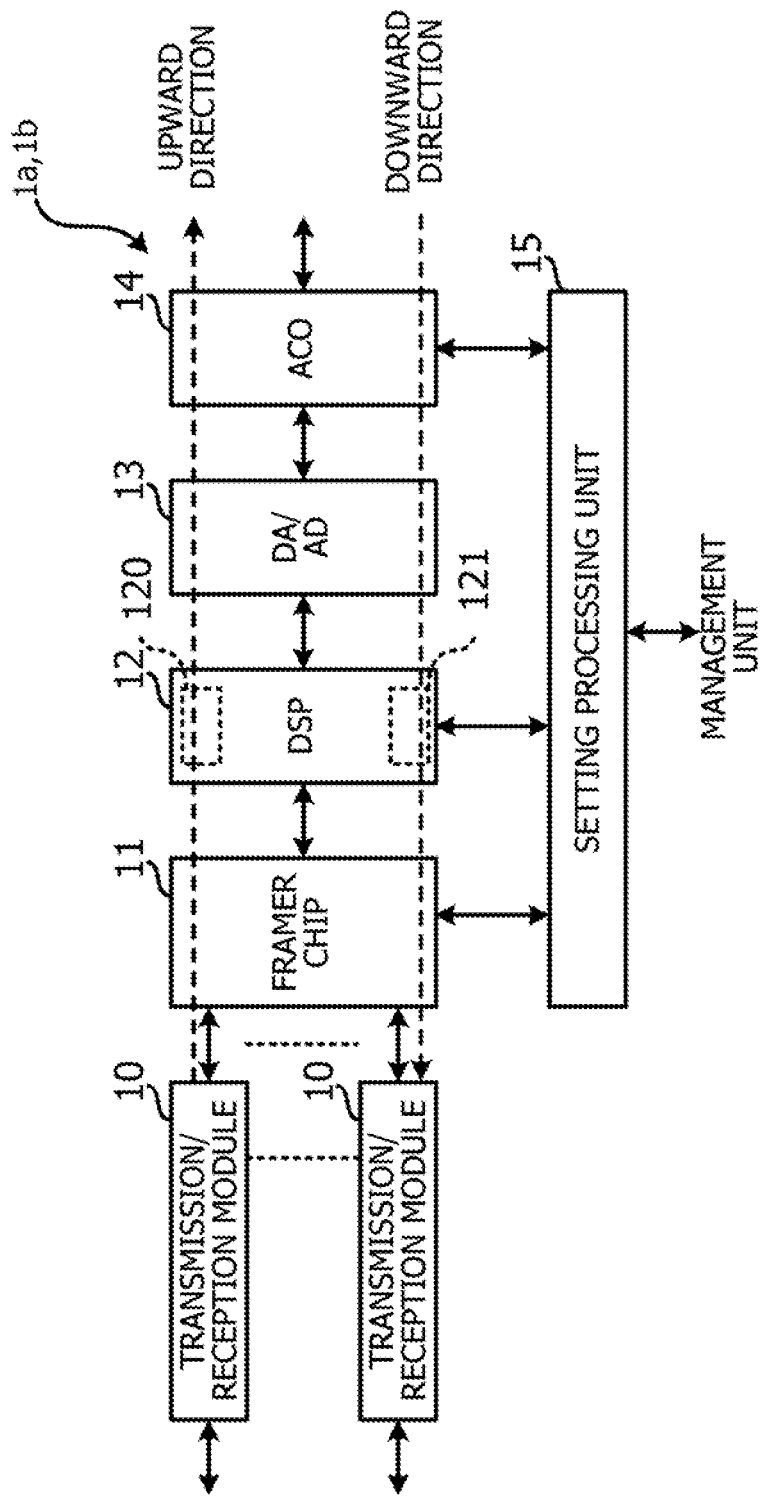
FIG. 2 is a configuration diagram illustrating an example of a transponder.

FIG. 2 is a configuration diagram illustrating an example of the transponders 1a and 1b. The transponders 1a and 1b include a plurality of transmission/reception modules 10, a framer chip 11, a digital signal processor (DSP) 12, an analog-digital conversion unit (DA/AD) 13, an analog coherent optics (ACO) 14, and a setting processing unit 15.

The transmission/reception modules 10 are optical modules detachable from a circuit board on which the framer chip 11 is mounted via an electrical connector, for example. The transmission/reception modules 10 transmit and receive client signals to and from the network devices 9. Examples of the frame format of the client signals include a synchronous optical network (SONET) frame and a GigabitEthernet (registered trademark) (GbE) frame, but are not limited to this.

First, description will be given of processing in the uplink direction toward the ACO 14 from the transmission/reception modules 10.

The transmission/reception modules 10 perform light-electricity conversion on client signals received from the network devices 9, and output the converted client signals to the framer chip 11. The framer chip 11 stores the client signals input from the respective transmission/reception modules 10 in a frame. In the present embodiment, an example of the frame is an OTUCn frame, but is not limited to this, and another frame may be used.

The framer chip 11 outputs the frame to the DSP 12. The DSP 12 generates an error correction code for the frame, modulates the frame with a multi-level modulation scheme, and outputs the modulated frame to the analog-digital conversion unit 13. The analog-digital conversion unit 13 converts the frame from a digital signal to an analog signal and outputs the converted frame to the ACO 14. The ACO 14 converts the frame from an electric signal to an optical signal and outputs the optical signal to the optical multiplexing units 30*a* and 30*b*.

Next, description will be given of processing in the downlink direction toward the transmission/reception modules 10 from the ACO 14.

The ACO 14 receives an optical signal, converts the optical signal into an electric signal, and outputs the electric signal to the analog-digital conversion unit 13. Note that the electric signal has the frame structure described above. The analog-digital conversion unit 13 converts the electric signal from an analog signal to a digital signal, and output the digital signal to the DSP 12. The DSP 12 performs demodulation processing on the electric signal to reproduce the frame, performs error correction, and then outputs the frame to the framer chip 11. Note that the ACO 14 is an example of first and second conversion circuits.

The framer chip 11 extracts client signals from the frame and outputs the client signals to the transmission/reception modules 10. The transmission/reception modules 10 convert the client signals from electric signals to optical signals and transmit the optical signals to the network devices 9.

Furthermore, the setting processing unit 15 performs various settings for the framer chip 11, the DSP 12, and the ACO 14 in accordance with instructions of the management units 6*a* and 6*b*.

Furthermore, the DSP 12 includes an encoding circuit 120 for encoding a plurality of bit strings in an uplink direction frame, and a decoding circuit 121 for decoding a plurality of bit strings in a downlink direction frame. Each of the bit strings is a series of bit values obtained by performing parallel conversion on serial data of the frame.

(Encoding and Decoding by BICM)

Figure 3:
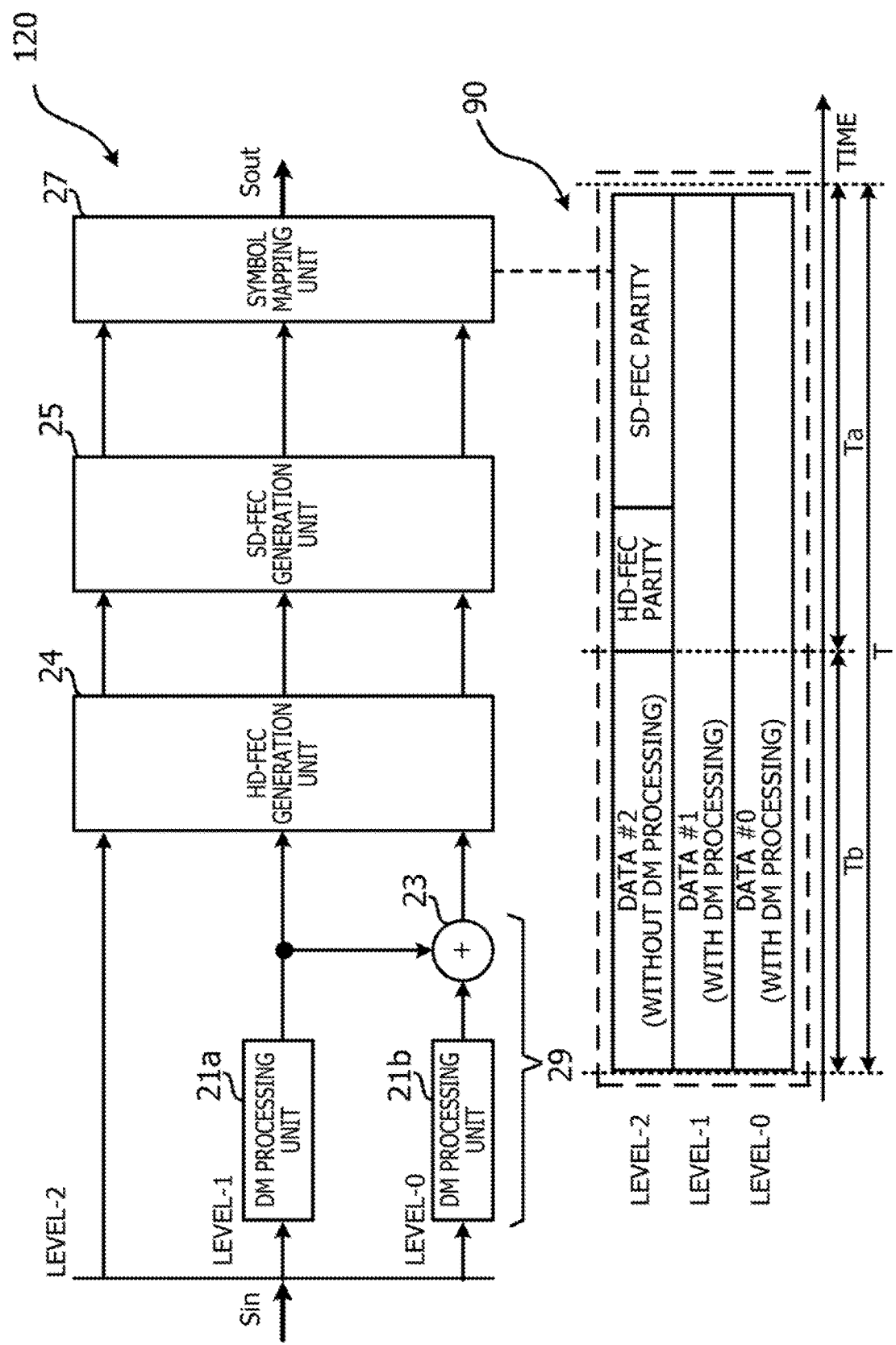
FIG. 3 is a configuration diagram illustrating an example of an encoding circuit using BICM.

FIG. 3 is a configuration diagram illustrating an example of the encoding circuit 120 using BICM. The encoding circuit 120 includes a PS conversion unit 29, an HD-FEC generation unit 24, an SD-FEC generation unit 25, and a symbol mapping unit 27. The PS conversion unit 29 includes DM processing units 21*a* and 21*b* and an exclusive OR (XOR) operator 23. Note that, in the present embodiment, 64 QAM is given as an example of the multi-level modulation scheme, but the multi-level modulation scheme is not limited to this.

A frame signal Sin input from the framer chip 11 is divided into three bit strings of level-0 to level-2 by serial-parallel conversion, for example. Here, the bit string of level-2 is the MSB, and level-0 is the LSB. Each of the bit strings of level-0 to level-2 is transmitted onto an individual lane.

The PS conversion unit 29 forms a probability distribution of symbol assignment for each of the bit strings of level-0 to level-2 by PS. The DM processing unit 21*a* performs DM processing on the bit string of level-1 and the DM processing unit 21*b* performs DM processing on the bit string of level-0. The mark rate of each of the bit strings of level-0 and level-1 therefore increases to a rate greater than 50(%) (for example, 80(%)), and the number of values of "1" becomes greater than that of "0" in each of the bit strings of level-0 and level-1.

The XOR operator 23 performs XOR the value of the bit string of level-0 with the value of the bit string of level-1. The value of the bit string of level-0 therefore becomes a value obtained by XORing the original value of the bit string of level-0 with the value of the bit string of level-1. Each of the bit strings is output from the PS conversion unit 29 to the HD-FEC generation unit 24.

The HD-FEC generation unit 24 generates an HD-FEC parity that is a hard decision code, from the bit strings of level-0 to level-2. The HD-FEC generation unit 24 inserts the HD-FEC parity into the bit string of level-2. Each of the bit strings is output from the HD-FEC generation unit 24 to the SD-FEC generation unit 25. Note that the HD-FEC parity is an example of a first error correction code used for correction of an error in a result of hard decision on each bit string.

The SD-FEC generation unit 25 generates an SD-FEC parity that is a soft decision code, from the bit strings of level-0 to level-2. The SD-FEC generation unit 25 inserts the SD-FEC parity into the bit string of level-2. Each of the bit strings is output from the SD-FEC generation unit 25 to the symbol mapping unit 27. Note that the SD-FEC parity is an example of a second error correction code used for correction of an error in a result of soft decision on each bit string.

The symbol mapping unit 27 assigns, to the bit strings, symbols corresponding to values of the bit strings of level-0 to level-2, the symbols being among a plurality of symbols in a constellation of 64QAM. The symbol mapping unit 27 outputs an output signal Sout corresponding to the assigned symbol to the analog-digital conversion unit 13.

Reference numeral 90 indicates contents of the bit strings in the frame input to the symbol mapping unit 27. The bit strings of level-0 and level-1 include data #0 and data #1 on which DM processing has been performed, respectively.

Furthermore, the bit string of level-2 includes data #2 that has not been subjected to DM processing, the HD-FEC parity, and the SD-FEC parity. The HD-FEC parity and the SD-FEC parity are inserted into a period Ta within a period T of the frame, and the data #2 is inserted into a period Tb within the period T of the frame. The periods Ta and Tb are set so that the HD-FEC parity and the SD-FEC parity are, for example, about 20(%) of the amount of data of the entire frame.

Figure 4:
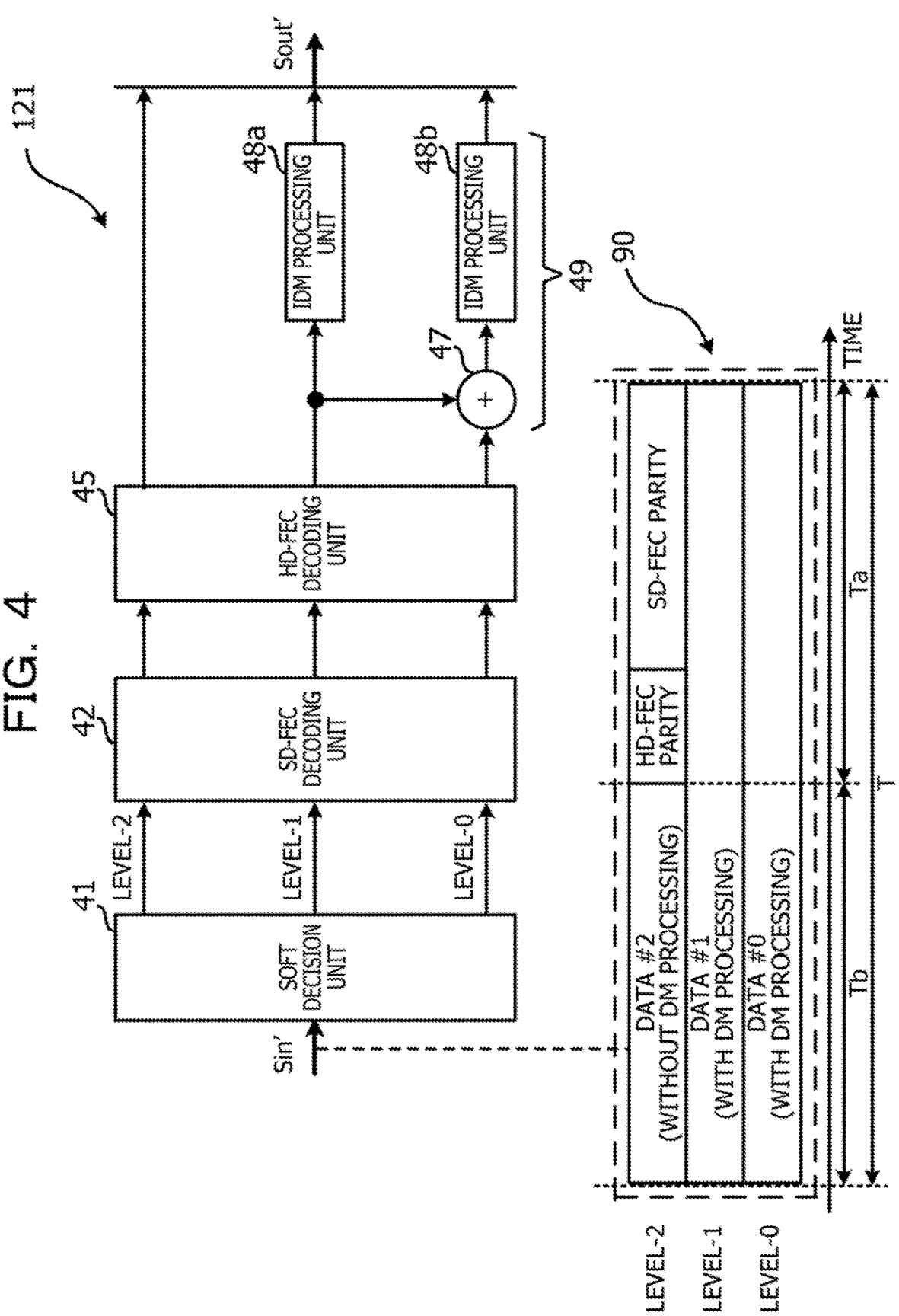
FIG. 4 is a configuration diagram illustrating an example of a decoding circuit using BICM.

FIG. 4 is a configuration diagram illustrating an example of the decoding circuit 121 using BICM. The decoding circuit 121 includes a soft decision unit 41, an SD-FEC decoding unit 42, an HD-FEC decoding unit 45, and a PS inverse conversion unit 49. The PS inverse conversion unit 49 includes an XOR operator 47 and inverse-DM (IDM) processing units 48*a* and 48*b*.

The soft decision unit 41 performs restoration by performing soft decision on a value of each of the bit strings of level-0 to level-2 from an input signal Sin' input from the analog-digital conversion unit 13. The soft decision unit 41 determines probability of values "0" and "1" of the bit strings from symbols indicated by the input signal Sin'. Each of the bit strings of level-0 to level-2 is transmitted to an individual lane. The soft decision unit 41 outputs the value of each of the bit strings of level-0 to level-2 to the SD-FEC decoding unit 42.

The SD-FEC decoding unit 42 corrects the values of the bit strings of level-0 to level-2 on the basis of the SD-FEC parity. For example, the SD-FEC decoding unit 42 performs decoding by using the SD-FEC parity. The SD-FEC decoding unit 42 outputs each of the bit strings of level-0 to level-2 to the HD-FEC decoding unit 45.

The HD-FEC decoding unit 45 corrects the value of each of the bit strings of level-0 to level-2 on the basis of the HD-FEC parity. For example, the HD-FEC decoding unit 45 performs decoding by using the HD-FEC parity. The HD-FEC decoding unit 45 outputs each of the bit strings of level-0 to level-2 to the PS inverse conversion unit 49.

The PS inverse conversion unit 49 performs conversion reverse to the conversion by the PS conversion unit 29 for each of the bit strings of level-0 to level-2. The XOR operator 47 performs XOR the value of the bit string of level-0 with the value of the bit string of level-1. The value of the bit string of level-0 therefore becomes the original value of the bit string of level-0 before being performed XOR by the XOR operator 23 of the encoding circuit 120.

The bit string of level-1 is input to the IDM processing unit 48a, and the bit string of level-0 is input from the XOR operator 47 to the IDM processing unit 48b.

The IDM processing units 48a and 48b perform inverse-DM processing that is inverse conversion processing of DM processing of the DM processing units 21a and 21b on the bit strings of level-1 and level-0, respectively. The bit strings of level-1 and level-0 therefore become values before being converted by the DM processing units 21a and 21b, respectively, of the PS conversion unit 29 in the encoding circuit 120. The bit strings of level-0 to level-2 are output to the framer chip 11 as an output signal Sout'.

The PS conversion unit 29 of the encoding circuit 120 converts the value of each of the bit strings of level-0 and level-1 so that a symbol closer to the center of the constellation of 64QAM is assigned more. A probability distribution is therefore formed in which a symbol closer to the center of the constellation has a higher probability of symbol assignment.

FIG. 5 is a diagram illustrating an example of processing of PS. In the present embodiment, a constellation of 16QAM is given as an example for convenience of description. In the constellation, symbols P11 to P14, P21 to P24, P31 to P34, and P41 to P44, which are signal points, are equally divided and arranged in the first to fourth quadrants.

The size of a circle indicating each of the symbols P11 to P14, P21 to P24, P31 to P34, and P41 to P44 indicates a value of the probability of symbol assignment. The probabilities of symbol assignment before PS are equal to each other among the symbols P11 to P14, P21 to P24, P31 to P34, and P41 to P44.

The probabilities of symbol assignment after PS become higher as the symbols P11 to P14, P21 to P24, P31 to P34, and P41 to P44 are closer to a center point O. For example, the symbols P22, P23, P32, and P33 having the shortest distance from the center point O have the maximum probability of symbol assignment, and the symbols P11, P14, P41, and P44 having the longest distance from the center point O have the minimum probability of symbol assignment.

In the formation of the probability distribution of symbol assignment, the value of each of the bit strings of level-0 and level-1 is converted so that the symbols P22, P23, P32, and P33 closer to the center point O have higher probabilities of symbol assignment, and quadrants of the symbols P11 to P14, P21 to P24, P31 to P34, and P41 to P44 are determined by the value of the bit string of level-2.

FIG. 6 is a diagram illustrating an example of symbol mapping. The symbol mapping unit 27 maps each of the bit strings of level-0 to level-2 to a symbol by Gray code mapping.

The symbol mapping unit 27 assigns the value of each of the bit strings of level-0 to level-2 to an I value and a Q value. For example, the symbol mapping unit 27 may assign the same value of each of the bit strings of level-0 to level-2 to both the I value and the Q value. For example, in a case where the value of the bit string of level-0 is "1", the I value and the Q value are each "1".

Furthermore, the symbol mapping unit 27 may alternately assign the value of each of the bit strings of level-0 to level-2 to the I value and the Q value. For example, in a case where the values of two consecutive bits in the bit string of level-0 are "1" and "0", the I value is "1" and the Q value is "1".

The I value and Q value of the bit string of level-2 determine a quadrant of a symbol to be assigned. In a case where the I value="0" and the Q value="0", a symbol in the first quadrant is assigned, and in a case where the I value="1" and the Q value="0", a symbol in the second quadrant is assigned. Furthermore, in a case where the I value="1" and the Q value="1", a symbol in the third quadrant is assigned, and in a case where the I value="0" and the Q value="0", a symbol in the fourth quadrant is assigned.

The PS conversion unit 29 XORs the value of the bit string of level-1 with the value of the bit string of level-0 by the XOR operator 23 so that a symbol closer to the center point O has a higher symbol assignment probability.

Figure 7:
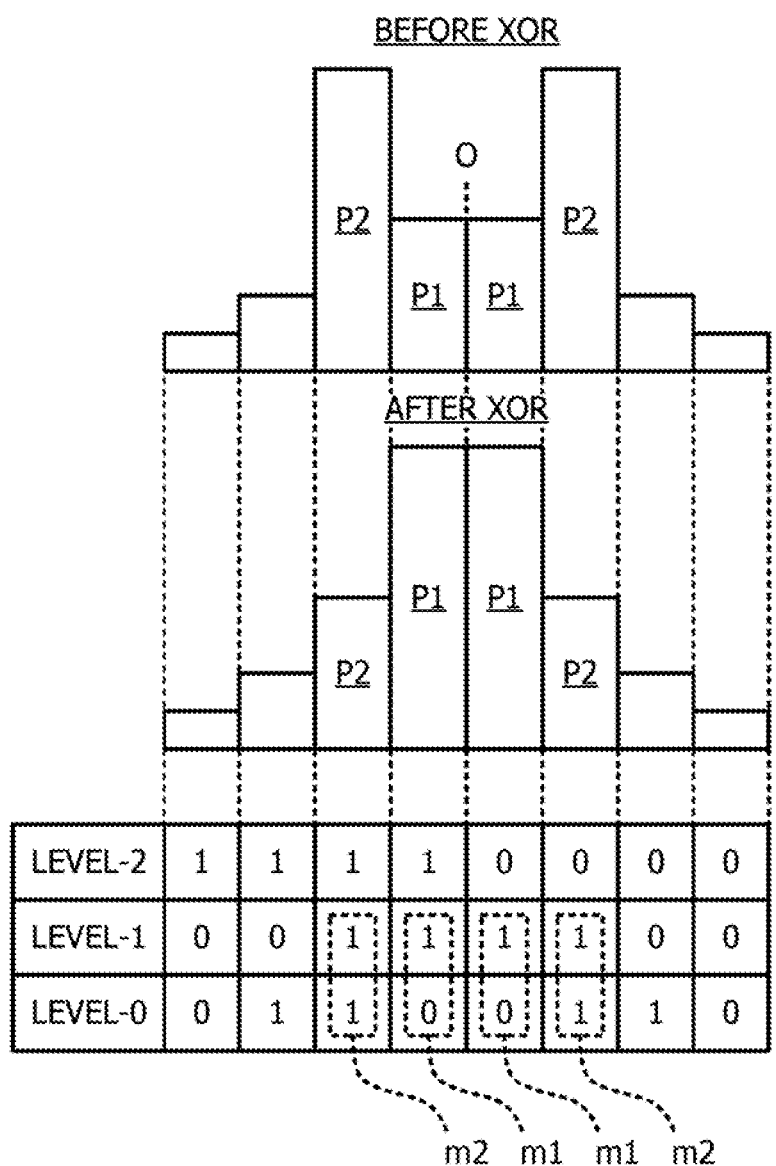
FIG. 7 is a diagram illustrating an example of a probability distribution of symbol assignment before and after XOR.

FIG. 7 is a diagram illustrating an example of the probability distribution of symbol assignment before and after performing XOR. Note that, the values of the bit strings of level-0 to level-2 in FIG. 7 may be any of the I value and the Q value.

The DM processing units 21a and 21b respectively convert the values of the bit strings of level-1 and level-0 so that the number of values of "1." becomes greater than that of "0", For this reason, a probability increases that the values of the bit strings of level-0 and level-1 are both "1" (see reference sign m2), and a symbol P1 closest to the center point O has a lower probability than that of a symbol P2 that is on the outer side of the symbol P1 in the probability distribution of symbol assignment before performing XOR.

However, in the arrangement of the Gray code, a probability increases that the value of the bit string of level-0 becomes "0" by being XORed with the value of the bit string of level-1. For this reason, a probability increases that the values of the bit strings of level-0 and level-1 becomes "0" and "1", respectively (see reference sign m1), and the symbol P1 closest to the center point O has a higher probability than that of the symbol P2 that is on the outer side of the symbol P1 in the probability distribution of symbol assignment after XOR.

Furthermore, the value of the bit string of level-2 is the HD-FEC parity and the SD-FEC parity generated respectively by the HD-FEC generation unit 24 and the SD-FEC generation unit 25. Since the mark rates of the HD-FEC parity and the SD-FEC parity are maintained close to 50(%), the first to fourth quadrants are selected with substantially the same probability, and a probability distribution is formed biased toward the center point O of the constellation over all quadrants. For this reason, the noise immunity of the output signal is increased.

However, as illustrated in FIG. 3, the SD-FEC generation unit 25 sets a whole of the bit strings of level-0 to level-2 (see the dotted frame) as an encoding target area (operation area for the SD-FEC parity). For example, the SD-FEC generation unit 25 generates an SD-FEC parity from the bit strings of level-0 to level-2. In comparison with the hard decision code, the soft decision code has a higher correction capability, but has a larger power consumption in encoding and decoding.

(Encoding and Decoding by MLC)

Figure 8:
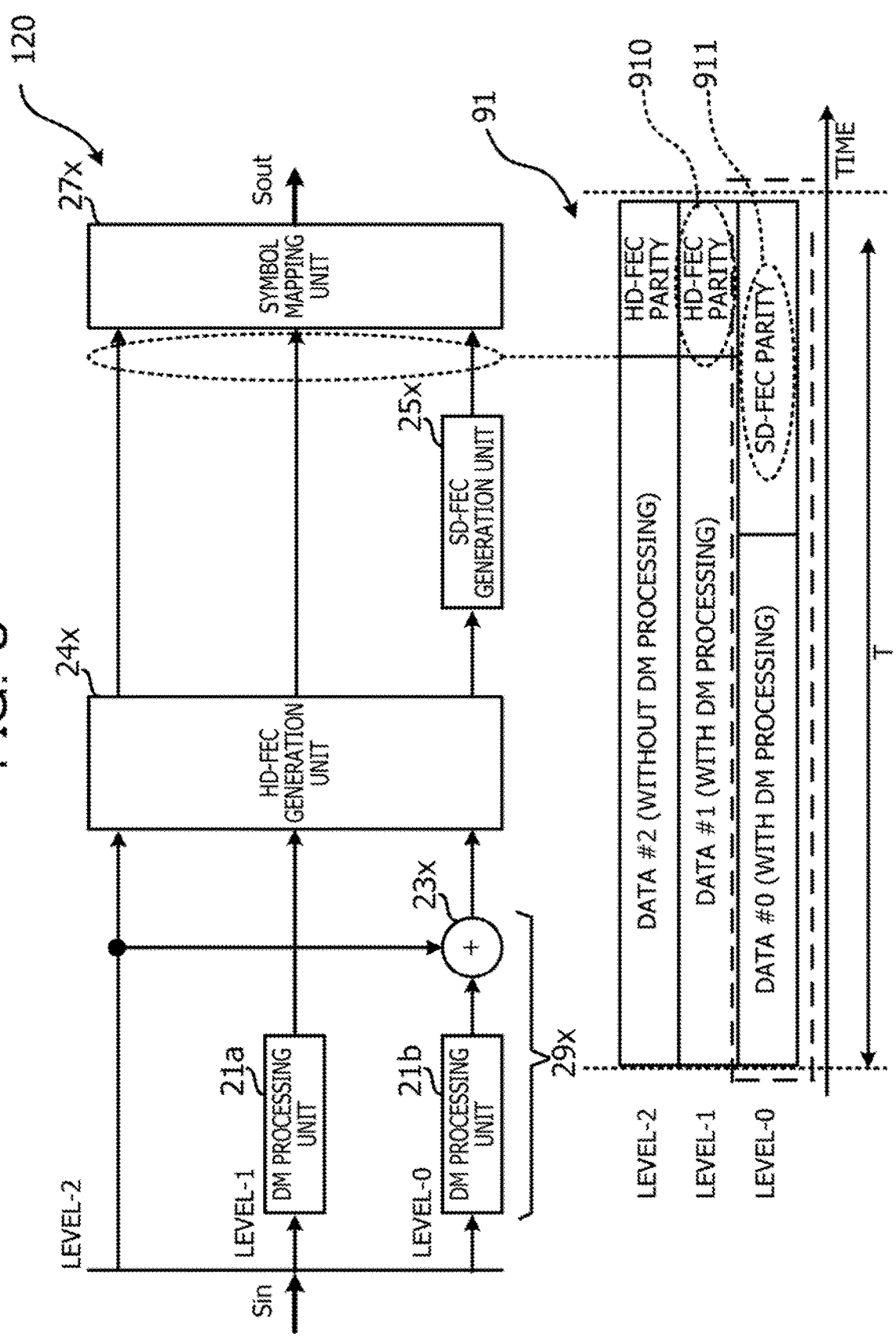
FIG. 8 is a configuration diagram illustrating an example of an encoding circuit using MLC.

FIG. 8 is a configuration diagram illustrating an example of the encoding circuit 120 using MLC. In FIG. 8, the same components as those in FIG. 3 are denoted by the same reference numerals, and description thereof will be omitted.

The encoding circuit 120 includes a PS conversion unit 29x, an HD-FEC generation unit 24x, an SD-FEC generation unit 25x, and a symbol mapping unit 27x. The PS conversion unit 29x includes the DM processing units 21a and 21b and an XOR operator 23x. Note that, in the present embodiment, 64QAM is given as an example of the multi-level modulation scheme, but the multi-level modulation scheme is not limited to this.

The PS conversion unit 29x converts the value of each of the bit strings of level-0 and level-1 so that a symbol closer to the center of the constellation of 64QAM is assigned more. The XOR operator 23x performs XOR the value of the bit string of level-0 with the value of the bit string of level-2. The value of the bit string of level-0 therefore becomes a value obtained by XORing the original value of the bit string of level-0 with the value of the bit string of level-2. Each of the bit strings is output from the PS conversion unit 29x to the HD-FEC generation unit 24x.

The HD-FEC generation unit 24x individually generates an HD-FEC parity that is a hard decision code, from the bit strings of level-0 to level-2. The HD-FEC generation unit 24x inserts the HD-FEC parity of the bit string of level-1 into the bit string of level-1, and inserts the HD-FEC parity of the bit string of level-2 into the bit string of level-2. Each of the bit strings of level-1 and level-2 is output from the HD-FEC generation unit 24x to the symbol mapping unit 27x.

Furthermore, the HD-FEC generation unit 24x inserts the HD-FEC parity of the bit string of level-0 into the bit string of level-0. The bit string of level-0 is output from the HD-FEC generation unit 24x to the SD-FEC generation unit 25x.

The SD-FEC generation unit 25x generates an SD-FEC parity that is a soft decision code, from the bit string of level-0. The SD-FEC generation unit 25x deletes the HD-FEC parity from the bit string of level-0, and inserts the SD-FEC parity into the bit string of level-0. The bit string of level-0 is output from the SD-FEC generation unit 25x to the symbol mapping unit 27x.

The symbol mapping unit 27x assigns, to the bit strings, symbols corresponding to the values of the bit strings of level-0 to level-2, the symbols being among the plurality of symbols in the constellation of 64QAM. The symbol mapping unit 27x outputs the output signal Sout corresponding to the assigned symbol to the analog-digital conversion unit 13.

Reference numeral 91 indicates contents of the bit strings in the frame input to the symbol mapping unit 27x. The bit string of level-0 includes data #0 on which DM processing has been performed, and the SD-FEC parity. The bit string of level-1 includes data #1 on which DM processing has been performed, and the HD-FEC parity, and the bit string of level-2 includes data #2 on which DM processing have not been performed, and the HD-FEC parity.

Figure 9:
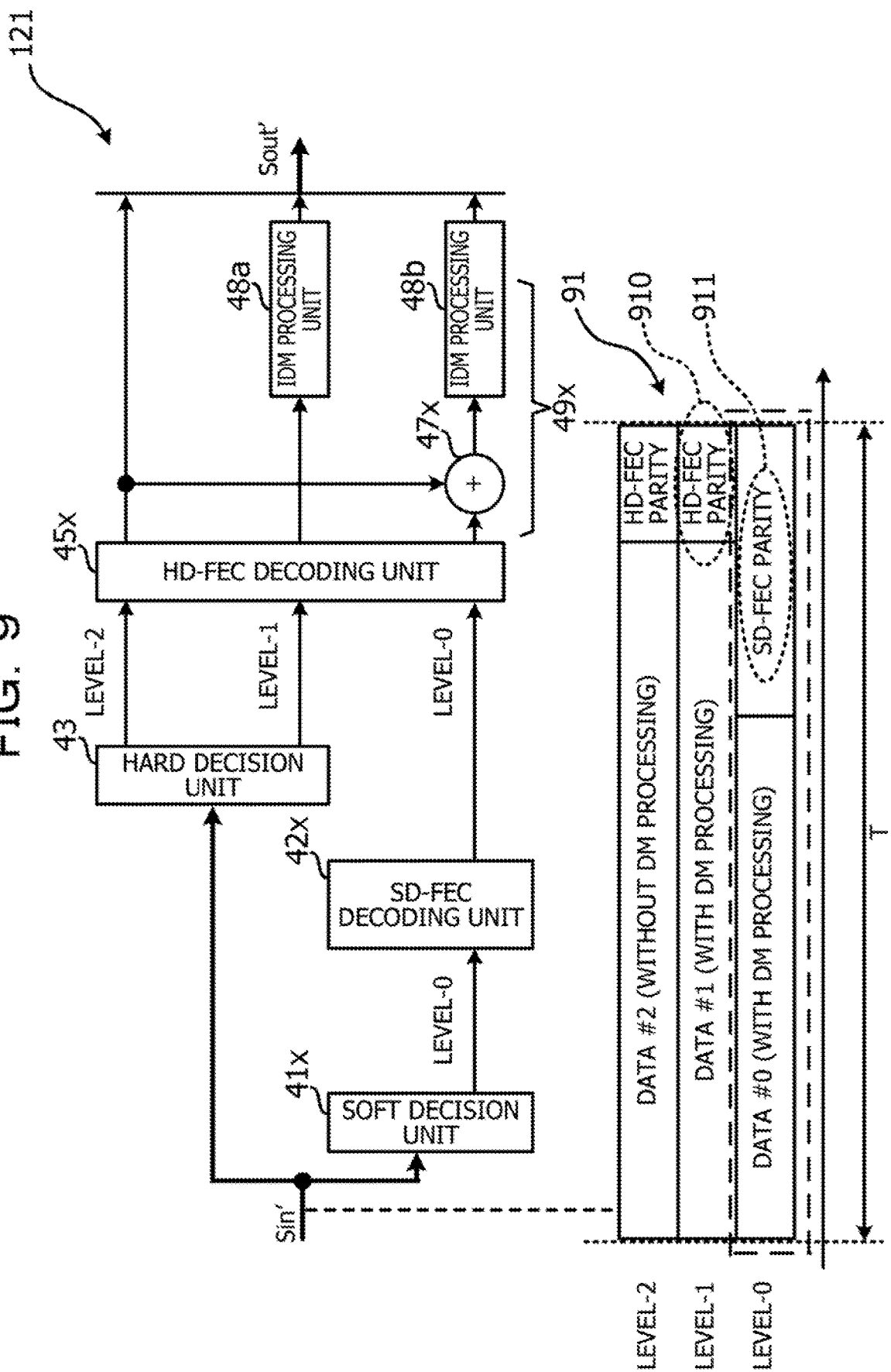
FIG. 9 is a configuration diagram illustrating an example of a decoding circuit using MLC.

FIG. 9 is a configuration diagram illustrating an example of the decoding circuit 121 using MLC. In FIG. 9, the same components as those in FIG. 4 are denoted by the same reference numerals, and description thereof will be omitted.

The decoding circuit 121 includes a soft decision unit 41x, an SD-FEC decoding unit 42x, a hard decision unit 43, an HD-FEC decoding unit 45x, and a PS inverse conversion unit 49x. The PS inverse conversion unit 49x includes an XOR operator 47x and the IDM processing units 48a and 48b. The input signal Sin' is input to each of the soft decision unit 41x and the hard decision unit 43.

The soft decision unit 41x performs restoration by performing soft decision on a value of the bit string of level-0 from the input signal Sin'. The soft decision unit 41x determines probability of values "0" and "1" of the bit strings from symbols indicated by the input signal Sin'. The soft decision unit 41x outputs the value of the bit string of level-0 to the SD-FEC decoding unit 42x.

The SD-FEC decoding unit 42x corrects the value of the bit string of level-0 on the basis of the SD-FEC parity. For example, the SD-FEC decoding unit 42x performs decoding by using the SD-FEC parity. The SD-FEC decoding unit 42x outputs the bit string of level-0 to the HD-FEC decoding unit 45x.

Furthermore, the hard decision unit 43 performs restoration by performing hard decision on a value of each of the bit strings of level-1 and level-2 from the input signal Sin'. The hard decision unit 43 determines values "0" and "1" of the bit strings from symbols indicated by the input signal Sin'. The hard decision unit 43 outputs the value of each of the bit strings of level-1 and level-2 to the HD-FEC decoding unit 45x.

The HD-FEC decoding unit 45x corrects the value of each of the bit strings of level-0 to level-2 on the basis of the HD-FEC parity. For example, the HD-FEC decoding unit 45x performs decoding by using the HD-FEC parity. The HD-FEC decoding unit 45x outputs each of the bit strings of level-0 to level-2 to the PS inverse conversion unit 49x.

The PS inverse conversion unit 49x performs conversion reverse to the conversion by the PS conversion unit 29x for each of the bit strings of level-0 to level-2. The XOR operator 47x performs XOR the value of the bit string of level-0 with the value of the bit string of level-2. The value of the bit string of level-0 therefore becomes the original value of the bit string of level-0 before being been XOR by the XOR operator 23x of the encoding circuit 120.

The bit string of level-1 is input to the IDM processing unit 48a, and the bit string of level-0 is input from the XOR operator 47x to the IDM processing unit 48b. The bit strings of level-0 to level-2 are output to the framer chip 11 as an output signal Sout'.

The PS conversion unit 29x of the encoding circuit 120 converts the value of each of the bit strings of level-0 and level-1 so that a symbol closer to the center of the constellation of 64QAM is assigned more. A probability distribution is therefore formed in which a symbol closer to the center constellation has a higher probability of symbol assignment.

Furthermore, the symbol mapping unit 27x performs symbol mapping different from the symbol mapping by the symbol mapping unit 27 of BICM.

FIG. 10A is a diagram illustrating another example of the symbol mapping. In FIG. 10A, description of contents common to FIG. 6 will be omitted.

The symbol mapping unit 27x maps each of the bit strings of level-0 to level-2 to a symbol by set-partitioning. The arrangement of the values of the bit strings of level-0 and level-1 in the set-partitioning is different from the arrangement in the Gray code.

According to this arrangement, the HD-FEC decoding unit 45x of the decoding circuit 121 performs multi-stage decoding (MSD), whereby the Euclidean distance between the symbols in the constellation may be made longer than that in the case of the Gray code. For example, in a case where the bit string of level-0 that is the LSB is correctly decoded with the I value=1 and the Q value=0, only solid line circle symbols in the constellation are used limitedly as decoding target symbols.

For this reason, even though the SD-FEC is applied only to the bit string of level-0, it is possible to reduce errors in the bit strings of level-1 and level-2 that are more significant levels, and suppress a reduction in error correction capability.

Furthermore, the PS conversion unit 29x performs XOR the value of the bit string of level-2 with the value of the bit string of level-0 by the XOR operator 23x so that a symbol closer to the center point O has a higher symbol assignment probability.

Figure 10B:
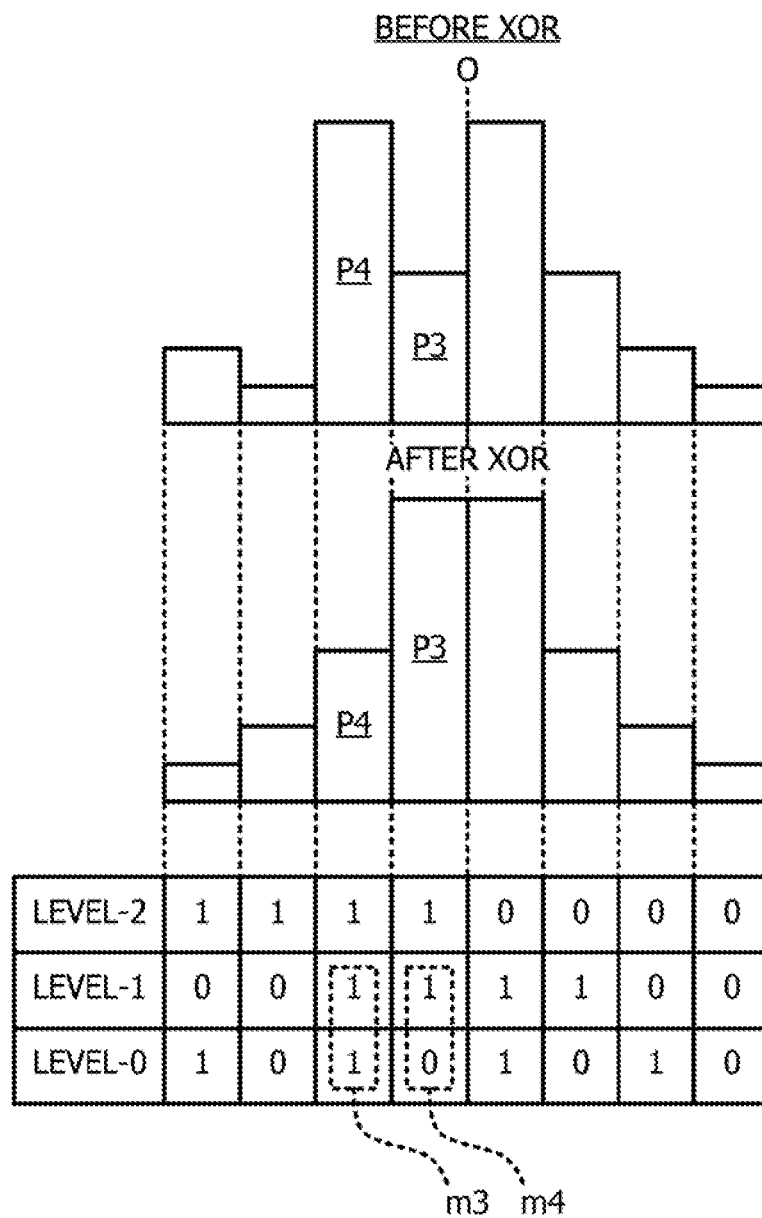
FIG. 10B is a diagram illustrating an example of the probability distribution of symbol assignment before and after XOR.

FIG. 10B is a diagram illustrating an example of the probability distribution of symbol assignment before and after XOR. Note that, in FIG. 10B, description of contents common to FIG. 7 will be omitted.

Since the DM processing units 21a and 21b respectively convert the values of the bit strings of level-1 and level-0 so that the number of values of "1" becomes greater than that of "0", the probability increases that the values of the bit strings of level-0 and level-1 are both "1" (see reference sign m3). Here, in the set-partitioning, the arrangement of the I value and the Q value of the bit string of level-0 is asymmetric with respect to the center point O. For this reason, on one side with respect to the center point O, a symbol P3 closest to the center point O has a lower probability than that of a symbol P4 that is on the outer side of the symbol P3 in the probability distribution of symbol assignment before being XOR.

However, in the arrangement of the set-partitioning, a probability increases that the value of the bit string of level-0 becomes "0" by being been XOR with the value of the bit string of level-2 symmetric with respect to the center point O. For this reason, a probability increases that the values of the bit strings of level-0 and level-1 become "0" and "1", respectively (see reference sign m4), and the symbol P3 closest to the center point O has a higher probability than that of the symbol P4 that is on the outer side of the symbol P3 in the probability distribution of symbol assignment after being XOR.

Furthermore, the value of the bit string of level-2 is the HD-FEC parity generated by the HD-FEC generation unit 24x. Since the mark rate of the HD-FEC parity is maintained close to 50(%), the first to fourth quadrants are selected with substantially the same probability.

As illustrated in FIGS. 8 and 9, in the frame using MLC, since the SD-FEC parity is generated only from the bit string of level-U, power consumption is reduced as compared with the case where BICM is used.

However, in a case where MLC is used, since the SD-FEC parity (see reference numeral 911) that may not be subjected to DM processing is inserted only into the bit string of level-0, there is a possibility that the effect is reduced of noise tolerance improvement by PS as compared to the case where BICM is used. Furthermore, since the HD-FEC parity (see reference numeral 910) that is not subjected to DM processing is inserted into the bit string of level-1, there also is a possibility that the effect is reduced of noise tolerance improvement by PS as compared to the case where BICM is used.

On the other hand, in a case where the SD-FEC parity and the HD-FEC parity are inserted into the bit string of level-2, which is not subject to DM processing, as in the example described below, a reduction in the effect of noise tolerance improvement is suppressed.

Figure 11:
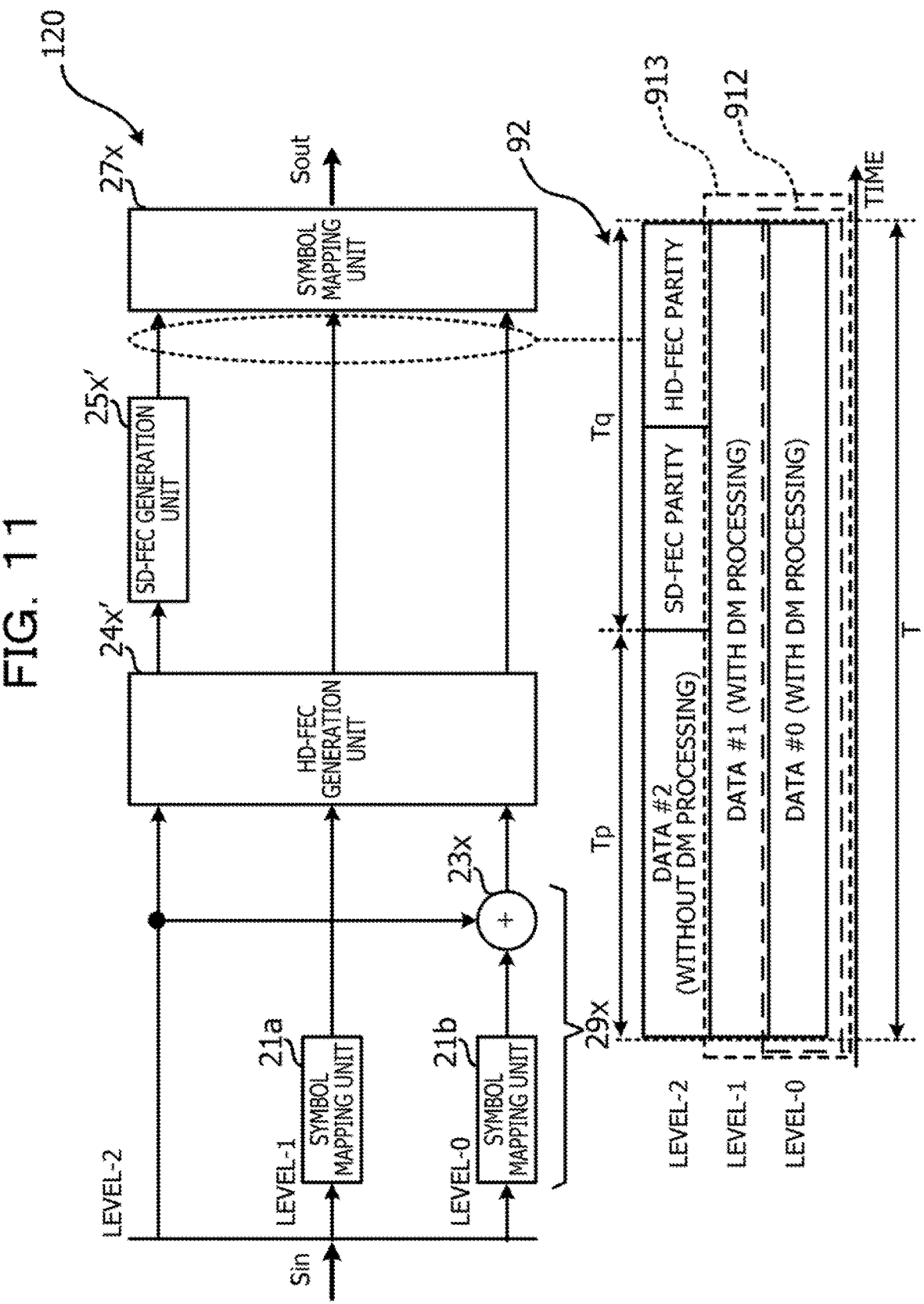
FIG. 11 is a configuration diagram illustrating another example of the encoding circuit using MLC.

FIG. 11 is a configuration diagram illustrating another example of the encoding circuit 120 using MLC. In FIG. 11, the same components as those in FIG. 8 are denoted by the same reference numerals, and description thereof will be omitted.

The encoding circuit 120 includes the PS conversion unit 29x, an HD-FEC generation unit 24x', an SD-FEC generation unit 25x', and the symbol mapping unit 27x. The PS conversion unit 29x includes the DM processing units 21a and 21b and the XOR operator 23x. Note that, in the present embodiment, 64QAM is given as an example of the multi-level modulation scheme, but the multi-level modulation scheme is not limited to this.

Reference numeral 92 indicates contents of the bit strings in the frame input to the symbol mapping unit 27x. The bit string of level-0 includes data #0 on which DM processing has been performed, the SD-FEC parity, and the HD-FEC parity. The bit string of level-1 includes data #1 on which DM processing has been performed, and the bit string of level-2 includes data #2 on which DM processing have not been performed. Note that, in the bit string of level-2, a period including data #2 is expressed as a period Tp, and a period including SD-FEC parity and HD-FEC parity is expressed as a period Tq.

The HD-FEC generation unit 24x' generates an HD-FEC parity similarly to the HD-FEC generation unit 24x so that the frame format described above may be formed, but unlike the HD-FEC generation unit 24x, the HD-FEC parity is inserted into the bit string of level-2. Furthermore, the SD-FEC generation unit 25x' generates an SD-FEC parity similarly to the SD-FEC generation unit 25x, but unlike the SD-FEC generation unit 25x, the SD-FEC parity is generated from data #2 in the bit string of level-2 and inserted into the bit string of level-2.

The SD-FEC parity in the period Tq has a value that is a bit string determined by operation processing on the entire data #0 indicated by reference numeral 912. For this reason, the value of the SD-FEC parity has not been determined at the start time of the period Tq.

Furthermore, the HD-FEC parity in the period Tq has a value that is a bit string determined by operation processing on a whole of data #0 and data #1 indicated by reference numeral 913. For this reason, the value of the HD-FEC parity has not been determined at the start time of the period Tq.

Thus, an XOR operation is not correctly executed in the period Tq. The purpose of the XOR operation is to change the probability distribution of symbol assignment before and after XOR as illustrated in FIG. 7. For this reason, in a case where the XOR operation is not performed normally, there is a possibility that a normal probability distribution is not obtained, and the effect of PS for noise immunity improvement is reduced.

EMBODIMENTS

The encoding circuit 120 of the present embodiment therefore delays the SD-FEC parity and the HD-FEC parity, and uses the SD-FEC parity and the HD-FEC parity for the XOR operation. The HD-FEC parity is generated from data #0 to data #2 of level-0 to level-2 in a frame and inserted into the bit string of level-2 in a subsequent frame. The SD-FEC parity is generated from data #0 of level-0 in each period that divides a period of the frame and is inserted into the bit string of level-2 in a subsequent period.

Thus, the XOR operation may be performed using the SD-FEC parity and the HD-FEC parity that are determined bit strings, so that the probability distribution of symbol assignment is formed normally.

First Embodiment

Figure 12:
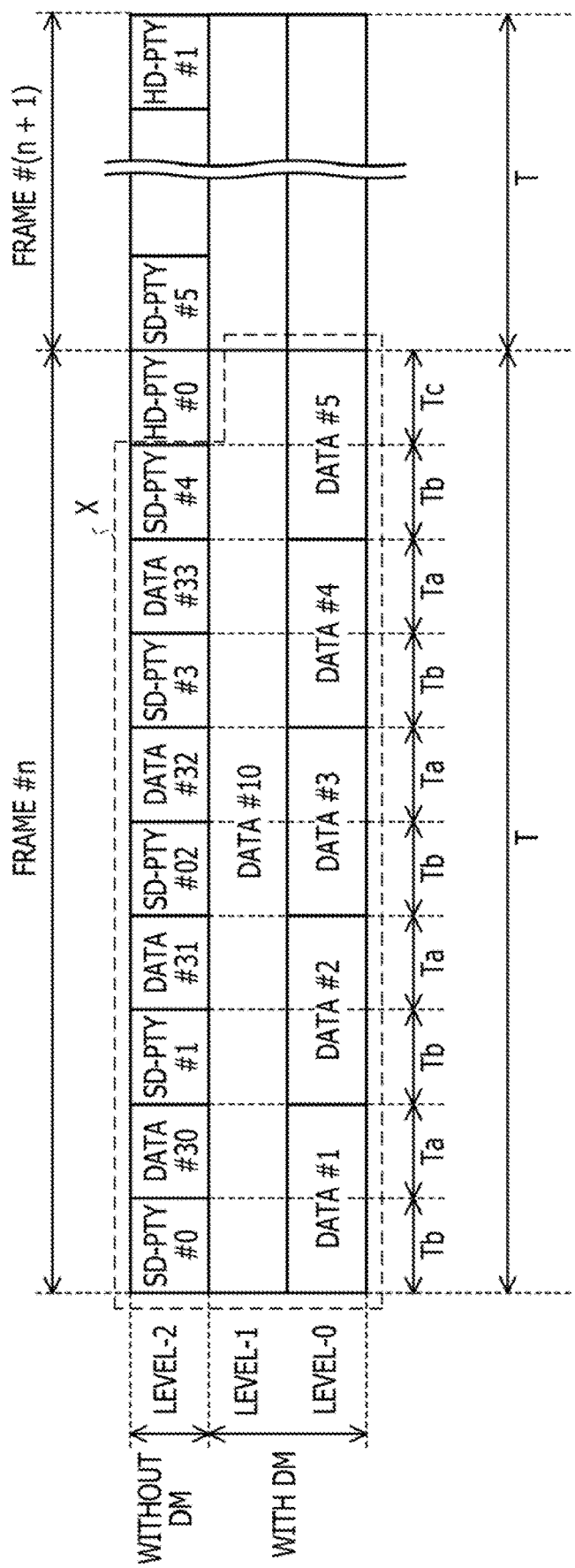
FIG. 12 is a diagram illustrating a frame format of n output signal output from an encoding circuit of a first embodiment.

FIG. 12 is a diagram illustrating a frame format of an output signal Sout output from an encoding circuit 120 of a first embodiment. In the present embodiment, a case where 64QAM is used as a multi-level modulation scheme will be described. In this case, a frame includes bit strings of level-0 to level-2. Note that the bit string of level-2 is an example of a first bit string, and the bit string of level-0 is an example of a second bit string.

A period T of frames #n and #(n+1), (n is a positive integer) is divided into a plurality of periods Ta and Tb and a period Tc at the end. In each of the frames #n and #(n+1), the periods Tb and Ta repeatedly arrive, and the period Tc arrives last. The frames #n and #(n+1) are examples of two consecutive frames in time series. Since the frame #(n+1) subsequent to the frame #n has the same configuration as the frame #n, description thereof will be omitted.

The bit string of level-0 in the frame #n includes data #1 to data #5 subject to DM processing. The data #1 to data #5 are each included in a bit string over a pair of periods Ta and Tb or a pair of periods Tb and Tc.

The bit string of level-1 in the frame #n includes data #10 subject to DM processing in any of the periods Ta to Tc.

The bit string of level-2 in the frame #n includes data #30 to data #33 not subject to DM processing, SD-FEC parities (SD-PTY) #0 to #4, and an HD-FEC parity (HD-PTY) #0. The SD-FEC parities #0 to #4 are each inserted into the bit string in a period Tb, and the data #30 to data #33 are each included in the bit string in a period Ta. Furthermore, the HD-PTY #0 is inserted into the bit string in the period Tc at the end.

The SD-FEC parities #1 to #4 are respectively generated from the data #1 to data #4, each in an immediately preceding pair of periods Ta and Tb. For this reason, the SD-FEC parities #1 to #4 are respectively inserted into bit strings with a delay of a pair of periods Ta and Tb from the data #1 to data #4 used to generate the SD-FEC parities #1 to #4.

Furthermore, the SD-FEC parity #0 is generated from data at the end of frame #(n−1) (not illustrated) immediately preceding the frame #n. Furthermore, the data #5 within the periods Tb and Tc is used to generate an SD-FEC parity #5 at the beginning of the frame #(n+1) next to the frame #n. In this way, the SD-FEC parities #0 to #5 are each inserted into periods Ta and Tb (or Tb and Tc) that are later than periods Ta and Tb (or Tb and Tc) of data used to generate the SD-FEC parity. Note that the pair of periods Ta and Tb and the pair of periods Tb and Tc are examples of a plurality of periods that divide a period T of a frame.

The HD-FEC parity #0 is generated from data included in each bit string in the immediately preceding frame #(n−1). Furthermore, the data #1 to #5, #10, and #30 to #33, and the SD-FEC parities #0 to #4 in the frame #n are used to generate an HD-FEC parity #1 in the frame #(n+1) next to the frame #n. For example, an area X in the frame #n excluding the HD-FEC parity #0 is used to generate the HD-FEC parity #1 in the frame #(n+1) next to the frame #n. In this way, the MD-FEC parities #0 and #1 are respectively inserted into the periods Tc in the frames #n and #(n+1) subsequent to the frames #(n−1) and #n of data used to generate the HD-FEC parities #0 and #1.

According to the frame format of the present embodiment, only the bit string of level-0 is used to generate an SD-FEC parity, so an operation area for the SD-FEC parity is limited to the bit string of level-0 and the bit string of level-2 in the period Tc where the SD-FEC parity is inserted. For this reason, the operation area for the SD-FEC parity becomes narrower than that of the BICM frame format illustrated in FIG. 3, and power consumption is reduced.

Furthermore, the frame #n includes the plurality of SD-FEC parities #0 to #4, and the operation area for the SD-FEC parities #0 to #4 is divided into a plurality of areas. For this reason, power consumption is reduced as compared with a case where an SD-FEC parity is generated from a series of consecutive operation areas.

Furthermore, since the SD-FEC parities and the HD-FEC parities are inserted into the bit string of level-2 that is not subject to DM processing, unlike the case of MLC illustrated in FIG. 9, a reduction of the amount of data of level-0 and level-1 subject to DM processing is suppressed.

For this reason, the encoding circuit 120 and a decoding circuit 121 respectively perform encoding processing and the decoding processing on the basis of the frame format described above, thereby reducing power consumption without reducing noise tolerance. Each of the configurations of the encoding circuit 120 and the decoding circuit 121 will be described below.

Figure 13:
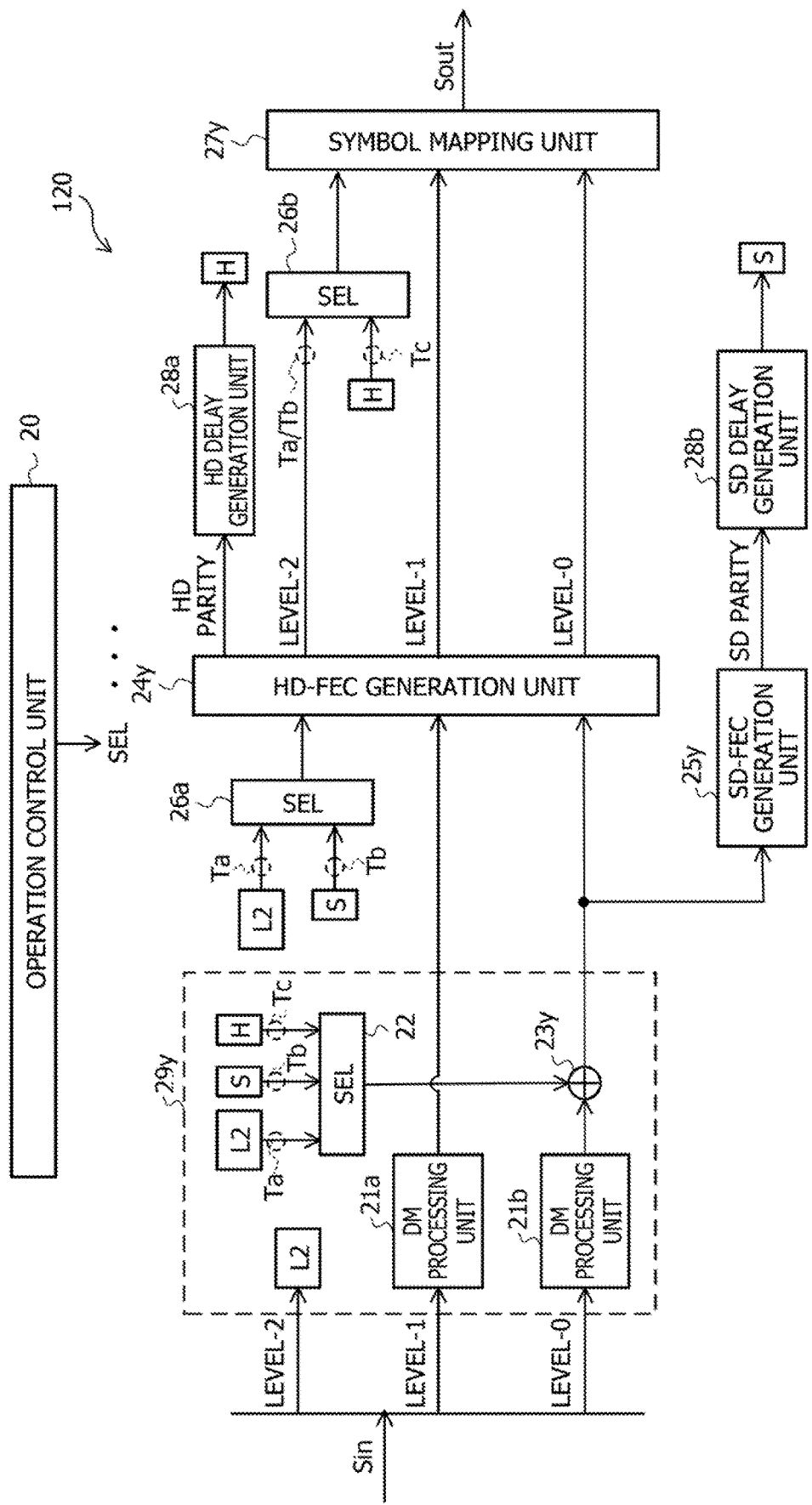
FIG. 13 is a configuration diagram illustrating the encoding circuit of the first embodiment.

FIG. 13 is a configuration diagram illustrating the encoding circuit 120 of the first embodiment. In FIG. 13, the same components as those in FIG. 3 are denoted by the same reference numerals, and description thereof will be omitted. Furthermore, the encoding method of the embodiment is encoding processing of the encoding circuit 120 described below. This will be described below with reference to FIGS. 12 and 13.

The encoding circuit 120 includes an operation control unit 20, a PS conversion unit 29y, an HD-FEC generation unit 24y, an SD-FEC generation unit 25y, a symbol mapping unit 27y, selectors (SELs) 26a and 26b, an HD delay generation unit 28a, and an SD delay generation unit 28b. The PS conversion unit 29y includes DM processing units 21a and 21b, a selector (SEL) 22, and an XOR operator 23y.

The operation control unit 20 switches among the periods Ta to Tc within the period T of the frame. For example, the operation control unit 20 controls the selectors 22, 26a, and 26b in accordance with the periods Ta to Tc.

In FIG. 13, "H" surrounded by a box indicates a connection relationship between an output and an input of an HD-FEC parity (HD parity), and "S" surrounded by a box indicates a connection relationship between an output and an input of an SD-FEC parity (SD parity), Note that the notation described above is also used in FIG. 13 and subsequent drawings in a similar manner. Furthermore, "L2" surrounded by a box indicates a connection relationship between an output and an input of data in the bit string of level-2.

Furthermore, signals input to the selectors 22, 26a, and 26b are denoted by reference signs (Ta, Tb, and Tc) indicating the periods Ta, Tb, and Tc during which the corresponding input signals are selected. For example, the selector 26a selects an HD-FEC parity as an input signal during the period Ta, and an SD-FEC parity during the period Tb. Note that the notation described above is also used in FIG. 13 and subsequent drawings in a similar manner.

Each of the bit strings of level-0 to level-2 is inputted to the PS conversion unit 29y. The PS conversion unit 29y is an example of a conversion unit, and converts the value of each of the bit strings of level-0 and level-1 other than level-2 so that a symbol closer to the center of a constellation is assigned more. Data #30 to data #33 in the bit string of level-2 are input to the selectors 22 and 26a.

The bit strings of level-1 and level-0 are inputted to the DM processing units 21a and 21b, respectively. The bit string of level-1 on which DM processing has been performed is inputted to the HD-FEC generation unit 24y. Furthermore, the bit string of level-0 on which DM processing has been performed is inputted to the XOR operator 23y.

The XOR operator 23y performs an XOR operation on the bit string of level-0 output from the DM processing unit 21b and data selected by the selector 22. The bit string of level-0 after being XOR is inputted to the HD-FEC generation unit 24y and the SD-FEC generation unit 25y.

The data #30 to data #33, an SD-FEC parity, and an HD-FEC parity in the bit string of level-2 are inputted to the selector 22. The selector 22 selects, as an input signal, any one of the data #30 to data #33, the SD-FEC parity, or the HD-FEC parity in the bit string of level-2 in accordance with the periods Ta to Tc controlled by the operation control unit 20.

The selector 22 selects the data #30 to data #33 in the bit string of level-2 during the period Ta, the SD-FEC parity during the period Tb, and the HD-FEC parity during the period Tc. The selected input signal is inputted to the XOR operator 23y. For this reason, the SD-FEC parity, the HD-FEC parity, and the data #30 to data #33 in the bit string of level-2 are used for the XOR operation in accordance with the periods Ta to Tc.

The SD-FEC generation unit 25y is an example of a second generation unit, and generates an SD-FEC parity from the bit string of level-0 in the periods Ta and Tb or the periods Tb and Tc. The SD-FEC generation unit 25y calculates an SD-FEC parity from the data #1 to data #4 of level-0 in the periods Ta and Tb or the data #5 in the periods Tb and Tc and outputs the SD-FEC parity to the SD delay generation unit 28b.

The SD delay generation unit 28b, which is an example of a second insertion unit, delays an SD-FEC parity, and inserts the SD-FEC parity into the bit string of level-2 in periods Ta and Tb or periods Tb and Tc that are later than periods Ta and Tb or periods Tb and Tc of the bit string of level-0 used to generate the SD-FEC parity. The SD delay generation unit 28b delays an SD-FEC parity input from the SD-FEC generation unit 25y once every pair of periods Ta and Tb or every pair of periods Tb and Tc by the total of the periods Ta and Tb or the total of the periods Tb and Tc, and outputs the SD-FEC parity to the selectors 22 and 26a. Note that the total of the periods Ta and Tb and the total of the periods Tb and Tc may be the same or different.

The data #30 to data #33 and the SD-FEC parity in the bit string of level-2 are input to the selector 26a. The selector 26a selects, as an input signal, any one of the data #30 to data #33 or the SD-FEC parity in the bit string of level-2 in accordance with the periods Ta and Tb controlled by the operation control unit 20. The selector 26a selects the data #30 to data #33 in the bit string of level-2 and outputs it to the HD-FEC generation unit 24y during the period Ta, and selects the SD-FEC parity and outputs it to the HD-FEC generation unit 24y during the period Tb.

The HD-FEC generation unit 24y is an example of a first generation unit, and generates an HD-FEC parity from the bit strings of level-0 to level-2 for each frame. The bit string of level-2 alternately includes data #30 to data #33 and SD-FEC parities. By switching of the selector 26a, the HD-FEC generation unit 24y generates an HD-FEC parity from the data #30 to data #33 during the period Ta, and generates an HD-FEC parity from the SD-FEC parities during the period Tb.

The HD-FEC generation unit 24y calculates an HD-FEC parity from the values of the bit strings of level-0 to level-2 for each frame and outputs the HD-FEC parity to the HD delay generation unit 28a. Note that, during the period Tc, the HD-FEC generation unit 24y receives no input of the bit string of level-2 from the selector 26a, and generates an HD-FEC parity from the bit strings of other levels, that is, level-0 and level-1.

The HD delay generation unit 28a, which is an example of a first insertion unit, delays an HD-FEC parity, and inserts the HD-FEC parity into the bit string of level-2 in a frame subsequent to a frame including the bit string used to generate the HD-FEC parity. The HD delay generation unit 28a delays the HD-FEC parity by the period T of the frame, and outputs the HD-FEC parity to the selector 22.

The HD-FEC generation unit 24y outputs, to the symbol mapping unit 27y, the bit strings of level-1 and level-0 respectively input from the DM processing units 21a and 21b as they are. Furthermore, the HD-FEC generation unit 24y outputs, to the selector 26b, the data #30 to data #33 or the SD-FEC parity in the bit string of level-2 input from the selector 26a as it is.

The selector 26b selects an input signal in accordance with controls in the periods Ta to Tc by the operation control unit 20. The selector 26b selects the data #30 to data #33 or the SD-FEC parity in the bit string of level-2 during the periods Ta and Tb, and selects the HD-FEC parity during the period Tc. The selector 26b outputs the selected input signal as a bit string of level-2 to the symbol mapping unit 27y.

The symbol mapping unit 27y is an example of an assigning unit, and assigns, to the bit strings of level-0 to level-2, symbols corresponding to the values of the bit strings of level-0 to level-2, the symbols being among a plurality of symbols in a constellation of 64QAM. The symbol mapping unit 27y performs symbol mapping by set-partitioning. The symbol mapping unit 27y outputs each of the bit strings of level-0 to level-2 as an output signal Sout.

Furthermore, to the selector 22, the HD-FEC parity is input from the HD delay generation unit 28a, and the SD-FEC parity is input from the SD delay generation unit 28b. For this reason, the delayed HD-FEC parity and SD-FEC parity are used in the XOR operator 23y.

The PS conversion unit 29y is therefore able to convert the bit string of level-0 using the HD-FEC parity and the SD-FEC parity determined by the HD-FEC generation unit 24y and the SD-FEC generation unit 25y, respectively, in stages following the PS conversion unit 29y. Thus, the probability distribution of symbol assignment is formed normally.

In this way, the symbol mapping unit 27y assigns, to the bit strings of level-0 to level-2, symbols corresponding to the values of the bit strings of level-0 to level-2, the symbols being among the plurality of symbols in the constellation of 64QAM. The PS conversion unit 29y converts the value of each of the bit strings of level-0 and level-1 other than the bit string of level-2 so that a symbol closer to the center of the constellation is assigned more.

The HD-FEC generation unit 24y generates an HD-FEC parity from the bit strings of level-0 to level-2 for each frame. The HD delay generation unit 28a delays an HD-FEC parity, and inserts the HD-FEC parity into the bit string of level-2 in a frame subsequent to a frame including the bit string used to generate the HD-FEC parity.

The SD-FEC generation unit 25y generates an SD-FEC parity from the bit string of level-0 in the periods Ta and Tb or the periods Tb and Tc. The SD delay generation unit 28b delays an SD-FEC parity, and inserts the SD-FEC parity into the bit string of level-2 in periods Ta and Tb or periods Tb and Tc that are later than periods Ta and Tb or periods Tb and Tc of the bit string of level-0 used to generate the SD-FEC parity.

Furthermore, the PS conversion unit 29y uses the delayed SD-FEC parity and HD-FEC parity for converting the value of the bit string of level-0.

According to the configuration described above, the HD-FEC parity and the SD-FEC parity are inserted into the bit string of level-2 that is not subject to conversion by the PS conversion unit 29y, that is, not subject to DM processing, so unlike the case of MIC illustrated in FIG. 9, the reduction of the amount of data of level-0 and level-1 subject to DM processing is suppressed, and the reduction in the effect of noise immunity improvement is suppressed.

Furthermore, since the SD-FEC parity is generated only from the bit string of level-0, the operation area for the SD-FEC parity becomes narrower than that of the case of BICM illustrated in FIG. 3, and power consumption is reduced. Furthermore, since the SD-FEC parity is generated once every pair of the periods Ta and Tb or every pair of periods Tb and Tc that divide the period T of the frame, power consumption is reduced as compared with the case where one SD-FEC parity is generated from the entire frame.

Furthermore, the ND-FEC parity is delayed and inserted into the subsequent frame, and the SD-FEC parity is delayed and inserted into periods Ta and Tb or periods Tb and Tc that are later than periods Ta and Tb or periods Tb and Tc of the bit string used to generate the SD-FEC parity. Since the delayed ND-FEC parity and SD-FEC parity are used for converting the value of the bit string of level-0, the probability distribution of symbol assignment is formed normally by using the determined ND-FEC parity and SD-FEC parity.

Thus, according to the encoding circuit 120 of the present embodiment, it is possible to reduce power consumption without reducing noise tolerance.

Figure 14:
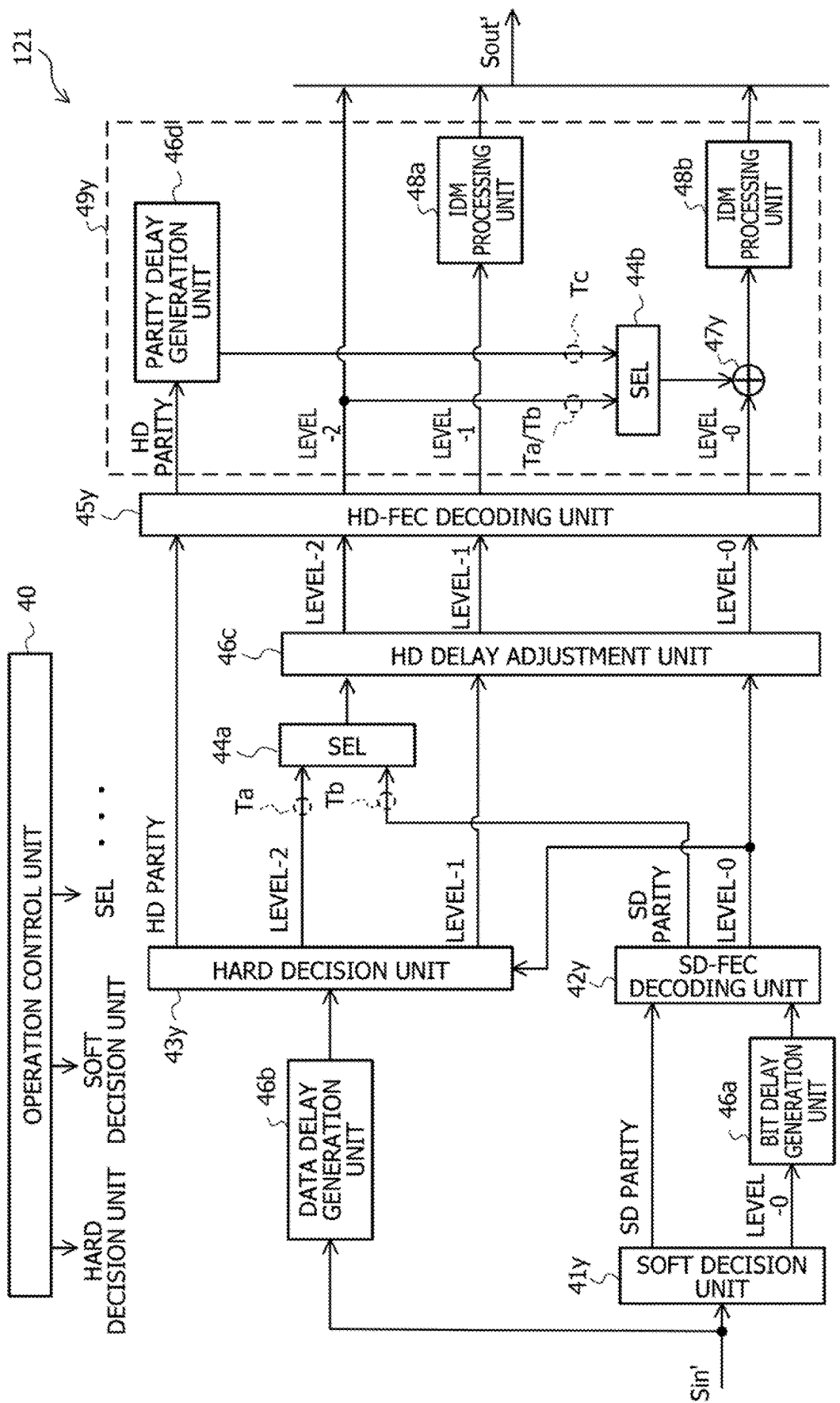
FIG. 14 is a configuration diagram illustrating a decoding circuit of the first embodiment.

FIG. 14 is a configuration diagram illustrating the decoding circuit 121 of the first embodiment. In FIG. 14, the same components as those in FIG. 4 are denoted by the same reference numerals, and description thereof will be omitted. Furthermore, the decoding method of the embodiment is decoding processing of the decoding circuit 121 described below. This will be described below with reference to FIGS. 12 and 14.

The decoding circuit 121 includes an operation control unit 40, a soft decision unit 41y, an SD-FEC decoding unit 42y, a hard decision unit 43y, a selector 44a, an HD-FEC decoding unit 45y, a bit delay generation unit 46a, a data delay generation unit 46b, an HD delay adjustment unit 46c, and a PS inverse conversion unit 49y. The PS inverse conversion unit 49y includes a selector 44b, a parity delay generation unit 46d, an XOR operator 47y, and IDM processing units 48a and 48b.

The operation control unit 40 notifies the hard decision unit 43y, the soft decision unit 41y, and the selectors 44a and 44b of the periods Ta to Tc in accordance with frame synchronization information, for example. The selectors 44a and 44b select an input signal in accordance with notifications of the periods Ta to Tc. The hard decision unit 43y detects an SD-FEC parity from the bit string of level-2 in accordance with a notification of the period Tb, and the soft decision unit 41y detects an HD-FEC parity from the bit string of level-2 in accordance with a notification of the period Tc.

An input signal Sin' is input from an analog-digital conversion unit 13 to the soft decision unit 41y and the hard decision unit 43y separately. The data delay generation unit 46b that delays the input signal Sin' is provided in a stage preceding the hard decision unit 43y.

The soft decision unit 41y is an example of a second decision unit, and performs soft decision on the value of the bit string of level-0 in a frame to which symbols in the constellation of 64QAM are assigned, on the basis of the symbols. At this time, the soft decision unit 41y performs symbol demapping by set-partitioning. On the basis of the result of the soft decision, the soft decision unit 41y extracts an SD-FEC parity from the bit string of level-2 in the period Ta, and outputs the SD-FEC parity to the SD-FEC decoding unit 42y.

Furthermore, on the basis of the result of the soft decision, the soft decision unit 41y outputs the data #1 to data #5 in the bit string of level-0 to the SD-FEC decoding unit 42y. The bit delay generation unit 46a that delays the bit string of level-0 is provided in a stage preceding the SD-FEC decoding unit 42y.

The bit delay generation unit 46a is an example of a second delay unit, and delays the bit string of level-0 by the periods Ta and Tb or the periods Tb and Tc. For this reason, the bit string of level-0 is input to the SD-FEC decoding unit 42y in synchronization with the SD-FEC parity delayed by the total of the periods Ta and Tb or the total of the periods Tb and Tc in the encoding circuit 120.

The SD-FEC decoding unit 42y is an example of a second correction unit, and corrects an error in a result of the soft decision by the soft decision unit 41y on the basis of the SD-FEC parity inserted into the bit string of level-2 during the periods Ta and Tb or the periods Tb and Tc. For example, the SD-FEC decoding unit 42y decodes the bit string of level-0 on the basis of the SD-FEC parity.

The timing at which the SD-FEC parity is input to the SD-FEC decoding unit 42y is synchronized with the timing at which the bit string of level-0 is input to the SD-FEC decoding unit 42y. For this reason, the SD-FEC decoding unit 42y may correct the value of the bit string of level-0 by using the SD-FEC parity in periods Ta and Tb or periods Ta and Tc that are later than periods Ta and Tb or periods Ta and Tc of the bit string of level-0. In the case of the example of FIG. 12, the data #1 in the bit string of level-0 is corrected by using the SD-FEC parity #1, and the data #2 in the bit string of level-0 is corrected by using the SD-FEC parity #2.

The bit string of level-0 is input from the SD-FEC decoding unit 42y to the hard decision unit 43y and the HD delay adjustment unit 46c. The SD-FEC parity is input from the SD-FEC decoding unit 42y to the selector 44a.

Furthermore, the hard decision unit 43y is an example of the second decision unit, and performs hard decision on the value of each of the bit strings of level-1 and level-2 among the bit strings of level-0 to level-2 to which symbols in the constellation of 64QAM are assigned, on the basis of the symbols. For example, the hard decision unit 43y is used for hard decision of the bit string of level-0 input from the SD-FEC decoding unit 42y. At this time, the hard decision unit 43y performs symbol demapping by set-partitioning. The bit string of level-2 is input from the hard decision unit 43y to the selector 44a, and the bit string of level-1 is input from the hard decision unit 43y to the HD delay adjustment unit 46c. Furthermore, on the basis of the result of the hard decision, the hard decision unit 43y extracts an HD-FEC parity from the bit string of level-2, and outputs the HD-FEC parity to the HD-FEC decoding unit 45y.

Furthermore, the data delay generation unit 46b delays each bit string input to the hard decision unit 43y. The data delay generation unit 46b delays each bit string for the same amount of time as the bit delay generation unit 46a. The timing at which the bit strings of level-1 and level-2 and the HD-FEC parity are input to the hard decision unit 43y and the timing at which the bit string and the SD-FEC parity are input to the SD-FEC decoding unit 42y are therefore aligned.

The selector 44a selects an input signal corresponding to the periods Ta to Tc from the data #30 to data #33 and the SD-FEC parity in the bit string of level-2 in accordance with controls in the periods Ta to Tc by the operation control unit 20. The selector 44a outputs the data #30 to data #33 in the bit string of level-2 to the HD delay adjustment unit 46c during the period Ta, and outputs the SD-FEC parity to the HD delay adjustment unit 46c during the period Tb.

The HD delay adjustment unit 46c, which is an example of a first delay unit, delays each of the bit strings of level-0 to level-2 by the period T of the frame, and outputs the delayed bit string to the HD-FEC decoding unit 45y.

The HD-FEC decoding unit 45y is an example of a first correction unit, and corrects an error in a result of the hard decision by the hard decision unit 43y on the basis of the HD-FEC parity inserted into the bit string of level-2 for each frame. Since each of the bit strings of level-0 to level-2 is input after being delayed by the period T of the frame, the HD-FEC decoding unit 45y may correct each of the bit strings of level-0 to level-2 on the basis of the HD-FEC parity inserted into the bit string of level-2 in a subsequent frame. The HD-FEC decoding unit 45y outputs each of the bit strings of level-0 to level-2 to the PS inverse conversion unit 49y.

The PS inverse conversion unit 49y is an example of an inverse conversion unit, and performs inverse conversion of the value of each of the bit strings of level-0 and level-1 converted by DM processing. The HD-FEC parity is input to the parity delay generation unit 46d, and the bit string of level-1 is input to the IDM processing unit 48a, Furthermore, the bit string of level-0 is input to the XOR operator 47y, and the bit string of level-2 is input to the selector 44b.

The parity delay generation unit 46d delays the HD-FEC parity in accordance with the period Tc within the period T of the frame, and outputs the HD-FEC parity to the selector 44b.

The selector 44b selects an input signal from the bit string of level-2 and the HD-FEC parity in accordance with controls in the periods Ta to Tc by the operation control unit 40. The selector 44b selects the bit string of level-2 and outputs it to the XOR operator 47y during the periods Ta and Tb, and selects the delayed HD-FEC parity and outputs it to the XOR operator 47y during the period Tc.

The XOR operator 47y XORs the bit string of level-0 with the bit string of level-2 or the HD-FEC parity from the selector 44b. Since the HD-FEC parity is input to the XOR operator 47y with a delay in accordance with the period Tc, the bit string of level-0 is normally converted to the value before XOR by the XOR operator 23y of the encoding circuit 120. The bit string of level-0 after XOR is input to the IDM processing unit 48b.

The bit string of level-2 and the bit strings of level-1 and level-0 respectively subjected to inverse-DM processing by the IDM processing units 48a and 48b are output to the framer chip 11 as an output signal Sout' by parallel-serial conversion, for example.

In this way, the HD delay adjustment unit 46c delays each of the bit strings of level-0 to level-2 so that an error in a result of the hard decision of each of the bit strings of level-1 and level-2 is corrected on the basis of the HD-FEC parity inserted into the bit string of level-2 in a subsequent frame. For this reason, the delay time given to the HD-FEC parity by the HD delay generation unit 28a of the encoding circuit 120 is reduced.

Furthermore, the bit delay generation unit 46a delays the bit string of level-0 so that an error in a result of the soft decision of the bit string of level-0 is corrected on the basis of the SD-FEC parity inserted into the bit string of level-2 in periods Ta and Tb or periods Tb and Tc that are later than periods Ta and Tb or periods Tb and Tc of the bit string of level-0. For this reason, the delay time given to the SD-FEC parity by the SD delay generation unit 28b of the encoding circuit 120 is reduced.

Thus, the decoding circuit 121 may correct errors in the hard decision and the soft decision of each of the bit strings of level-0 to level-2 on the basis of the HD-FEC parity and SD-FEC parity delayed by the encoding circuit 120.

The PS inverse conversion unit 49y performs inverse conversion of the value of the bit string of level-0 delayed by the bit delay generation unit 46a and the HD delay adjustment unit 46c by using the HD-FEC parity inserted into the bit string of level-2 in a subsequent frame, and the SD-FEC parity inserted into periods Ta and Tb or periods Ta and Tc that are later than periods Ta and Tb or periods Ta and Tc of the bit string of level-2.

For this reason, the PS inverse conversion unit 49y may normally perform inverse conversion of the bit string of level-0 using the HD-FEC parity and SD-FEC parity delayed by the encoding circuit 120.

Thus, the decoding circuit 121 may decode a bit string on the basis of encoding by the encoding circuit 120, thereby reducing power consumption without reducing noise tolerance.

Second Embodiment

Figure 15:
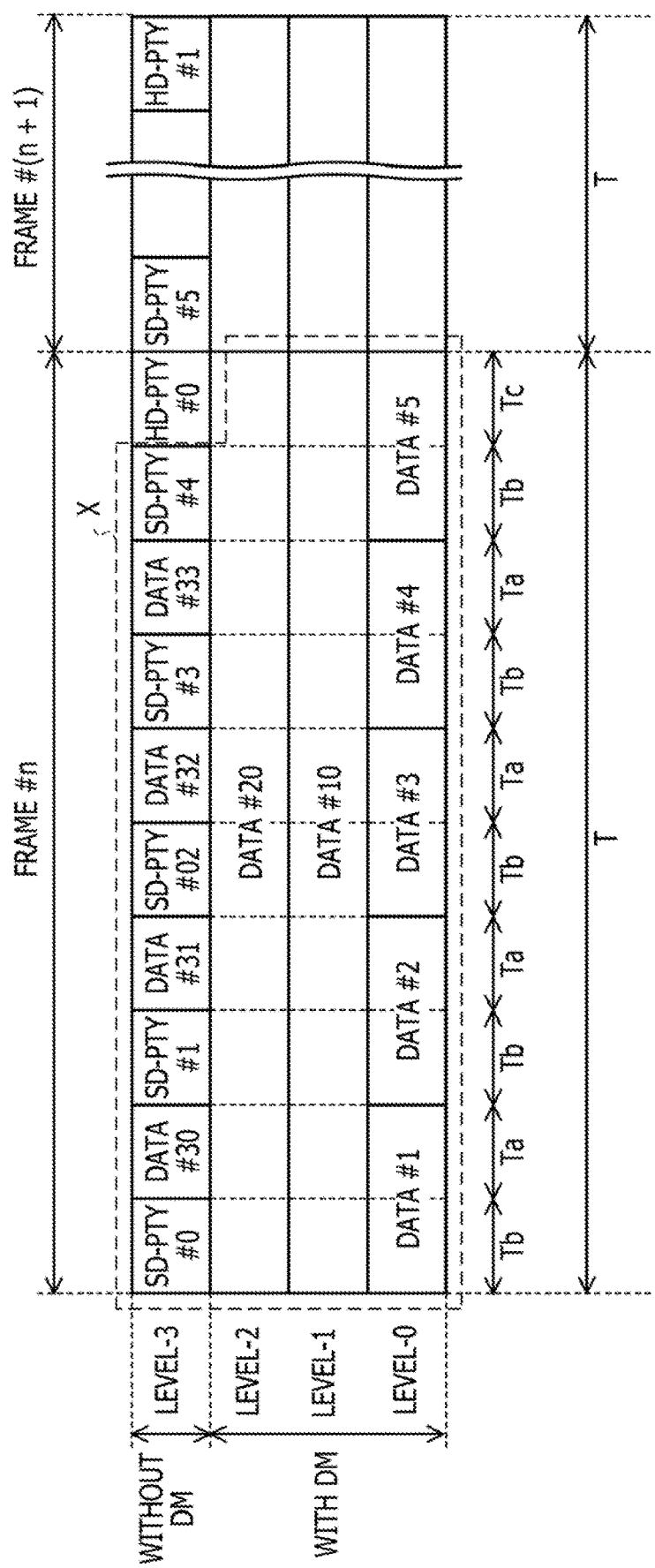
FIG. 15 is a diagram illustrating a frame format of an output signal output from an encoding circuit of a second embodiment.

FIG. 15 is a diagram illustrating a frame format of an output signal Sout output from an encoding circuit 120 of a second embodiment. In the present embodiment, a case where 256QAM is used as a multi-level modulation scheme will be described. In this case, a frame includes bit strings of level-0 to level-3. Note that, in FIG. 15, the same components as those in FIG. 12 are denoted by the same reference numerals, and description thereof will be omitted.

The bit strings of level-1 and level-2 in frame #n respectively include data #10 and data #20 subject to DM processing in any of periods Ta to Tc.

The bit string of level-3 in the frame #n includes data #30 to data #33 not subject to DM processing, SD-FEC parities (SD-PTY) #0 to #4, and an HD-FEC parity (HD-PTY) #0. The SD-FEC parities #0 to #4 are each inserted into the bit string in a period Tb, and the data #30 to data #33 are each included in the bit string in a period Ta. Furthermore, the HD-PTY #0 is inserted into the bit string in the period Tc at the end.

In comparison with the frame format of the first embodiment, the frame format of the present embodiment additionally has a bit string of level-2 including data #120 on which DM processing has been performed, but has the same configuration for other levels, that is, level-0, level-1, and level-3. For this reason, according to the frame format of the present embodiment, an effect similar to that of the frame format of the first embodiment may be obtained.

For this reason, the encoding circuit 120 and a decoding circuit 121 respectively perform encoding processing and the decoding processing on the basis of the frame format described above, thereby reducing power consumption without reducing noise tolerance. Each of the configurations of the encoding circuit 120 and the decoding circuit 121 will be described below.

Figure 16:
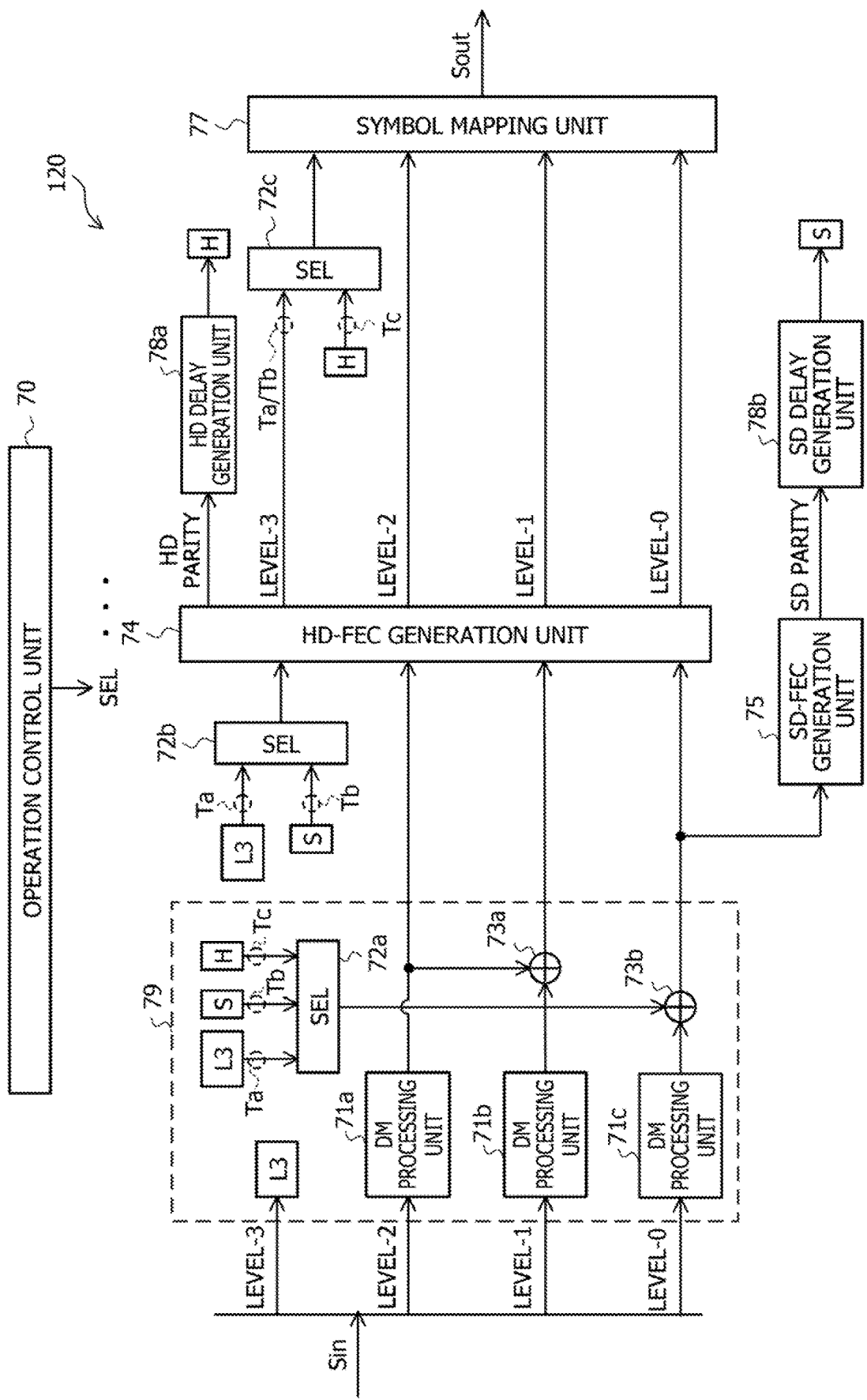
FIG. 16 is a configuration diagram illustrating the encoding circuit of the second embodiment.

FIG. 16 is a configuration diagram illustrating the encoding circuit 120 of the second embodiment. The encoding method of the embodiment is encoding processing of the encoding circuit 120 described below. This will be described below with reference to FIGS. 15 and 16.

The encoding circuit 120 includes an operation control unit 70, a PS conversion unit 79, an HD-FEC generation unit 74, an SD-FEC generation unit 75, a symbol mapping unit 77, selectors (SELs) 72b and 72c, an HD delay generation unit 78a, and an SD delay generation unit 78b. The PS conversion unit 79 includes DM processing units 71a to 71c, a selector (SEL) 72a, and XOR operators 73a and 73b.

Each of the bit strings of level-0 to level-3 is input to the PS conversion unit 79. The PS conversion unit 79 is an example of the conversion unit, and converts the value of each of the bit strings of level-0 to level-2 other than level-3 so that a symbol closer to the center of a constellation is assigned more. The data #30 to data #33 in the bit string of level-3 are input to the selectors 72a and 72b.

The bit strings of level-2, level-1, and level-0 are input to the DM processing units 71a to 71c, respectively. The DM processing units 71a to 71c perform DM processing similarly to the DM processing units 21a and 21b. The bit string of level-2 on which DM processing has been performed is input to the HD-FEC generation unit 74. Furthermore, the bit strings of level-1 and level-0 on which DM processing has been performed are input to the XOR operators 73a and 73b, respectively.

The XOR operator 73a performs an XOR operation on the bit string of level-1 output from the DM processing unit 71b and the bit string of level-2 output from the DM processing unit 71a. The bit string of level-1 after XOR is input to the HD-FEC generation unit 74.

The XOR operator 73b performs an XOR operation on the bit string of level-0 output from the DM processing unit 71c and data selected by the selector 72a. The bit string of level-0 after performed XOR is input to the HD-FEC generation unit 74 and the SD-FEC generation unit 75.

The data #30 to data #33, an SD-FEC parity, and an HD-FEC parity in the bit string of level-3 are input to the selector 72a. The selector 72a selects, as an input signal, any one of the bit string of level-3, the SD-FEC parity, or the HD-FEC parity in accordance with the periods Ta to Tc controlled by the operation control unit 70.

The selector 72a selects the bit string of level-3 during the period Ta, selects the SD-FEC parity during the period Tb, and selects the HD-FEC parity during the period Tc. The selected input signal is input to the XOR operator 73b. For this reason, the SD-FEC parity, the HD-FEC parity, and the data #30 to data #33 in the bit string of level-3 are used for the XOR operation in accordance with the periods Ta to Tc.

The SD-FEC generation unit 75 is an example of the second generation unit, and generates an SD-FEC parity from the bit string of level-0 in the periods Ta and Tb or the periods Tb and Tc. The SD-FEC generation unit 75 calculates an SD-FEC parity from data #1 to data #4 of level-0 in the periods Ta and Tb or data #5 in the periods Tb and Tc and outputs the SD-FEC parity to the SD delay generation unit 78b.

The SD delay generation unit 78b, which is an example of the second insertion unit, delays an SD-FEC parity, and inserts the SD-FEC parity into the bit string of level-2 in periods Ta and Tb or periods Tb and Tc that are later than periods Ta and Tb or periods Tb and Tc of the bit string of level-0 used to generate the SD-FEC parity. The SD delay generation unit 78b delays an SD-FEC parity input from the SD-FEC generation unit 75 once every pair of periods Ta and Tb or every pair of periods Tb and Tc by the total of the periods Ta and Tb or the total of the periods Tb and Tc, and outputs the SD-FEC parity to the selectors 72a and 72b.

The data #30 to data #33 and the SD-FEC parity in the bit string of level-3 are input to the selector 72b. The selector 72b selects, as an input signal, any one of the data #30 to data #33 or the SD-FEC parity in the bit string of level-3 in accordance with the periods Ta and Tb controlled by the operation control unit 70. The selector 72b selects the data #30 to data #33 in the bit string of level-3 and outputs it to the HD-FEC generation unit 74 during the period Ta, and selects the SD-FEC parity and outputs it to the HD-FEC generation unit 74 during the period Tb.

The HD-FEC generation unit 74 is an example of the first generation unit, and generates an HD-FEC parity from the bit strings of level-0 to level-3 for each frame. The bit string of level-3 alternately includes data #30 to data #33 and SD-FEC parities, By switching of the selector 72b, the HD-FEC generation unit 74 generates an HD-FEC parity from the data #30 to data #33 during the period Ta, and generates an HD-FEC parity from the SD-FEC parities during the period Tb.

The HD-FEC generation unit 74 calculates an HD-FEC parity from values of the bit strings of level-0 to level-3 for each frame and outputs the HD-FEC parity to the HD delay generation unit 78a. Note that, during the period Tc, the HD-FEC generation unit 74 receives no input of the bit string of level-3 from the selector 72b, and generates an HD-FEC parity from the bit strings of other levels, that is, level-0 to level-2.

The HD delay generation unit 78a, which is an example of the first insertion unit, delays an HD-FEC parity, and inserts the HD-FEC parity into the bit string of level-2 in a frame subsequent to a frame including the bit string used to generate the HD-FEC parity. The HD delay generation unit 78a delays the HD-FEC parity by a period T of a frame, and outputs the HD-FEC parity to the selectors 72a and 72c.

The HD-FEC generation unit 74 outputs, to the symbol mapping unit 77, the bit strings of level-2, level-1, and level-0 respectively input from the DM processing units 71a to 71c as they are. Furthermore, the HD-FEC generation unit 74 outputs, to the selector 72c, the data #30 to data #33 or the SD-FEC parity in the bit string of level-3 input from the selector 72b as it is.

The selector 72c selects an input signal in accordance with controls in the periods Ta to Tc by the operation control unit 70. The selector 72c selects the data #30 to data #33 or the SD-FEC parity in the bit string of level-3 during the periods Ta and Tb, and selects the HD-FEC parity during the period Tc. The selector 72c outputs the selected input signal as a bit string of level-3 to the symbol mapping unit 77.

The symbol mapping unit 77 is an example of the assigning unit, and assigns, to the bit strings of level-0 to level-3, symbols corresponding to the values of the bit strings of level-0 to level-3, the symbols being among a plurality of symbols in a constellation of 256QAM. The symbol mapping unit 77 performs symbol mapping by set-partitioning. The symbol mapping unit 77 outputs each of the bit strings of level-0 to level-3 as an output signal Sout.

Furthermore, to the selector 72a, the HD-FEC parity is input from the HD delay generation unit 78a, and the SD-FEC parity is input from the SD delay generation unit 78b. For this reason, the delayed HD-FEC parity and SD-FEC parity are used in the XOR operator 73b.

The PS conversion unit 79 is therefore able to convert the bit string of level-0 using the HD-FEC parity and the SD-FEC parity determined by the HD-FEC generation unit 74 and the SD-FEC generation unit 75, respectively, in stages following the PS conversion unit 79. Thus, the probability distribution of symbol assignment is formed normally.

In this way, the symbol mapping unit 77 assigns, to the bit strings of level-0 to level-3, symbols corresponding to the values of the bit strings of level-0 to level-3, the symbols being among the plurality of symbols in the constellation of 256QAM. The PS conversion unit 79 converts the value of each of the bit strings of level-0 to level-2 other than the bit string of level-3 so that a symbol closer to the center of the constellation is assigned more.

The HD-FEC generation unit 74 generates an HD-FEC parity from the bit strings of level-0 to level-3 for each frame. The HD delay generation unit 78a delays an HD-FEC parity, and inserts the HD-FEC parity into the bit string of level-3 in a frame subsequent to a frame including the bit string used to generate the HD-FEC parity.

The SD-FEC generation unit 75 generates an SD-FEC parity from the bit string of level-0 in the periods Ta and Tb or the periods Tb and Tc. The SD delay generation unit 78b delays an SD-FEC parity, and inserts the SD-FEC parity into the bit string of level-2 in periods Ta and Tb or periods Tb and Tc that are later than periods Ta and Tb or periods Tb and Tc of the bit string of level-0 used to generate the SD-FEC parity.

Furthermore, the PS conversion unit 79 uses the delayed SD-FEC parity and HD-FEC parity for converting the value of the bit string of level-0.

In comparison with the configuration of the first embodiment, the configuration described above is the same except for a difference due to the addition of the bit string of level-2 on which DM processing has been performed. Thus, according to the encoding circuit 120 of the present embodiment, it is possible to reduce power consumption without reducing noise tolerance.

Figure 17:
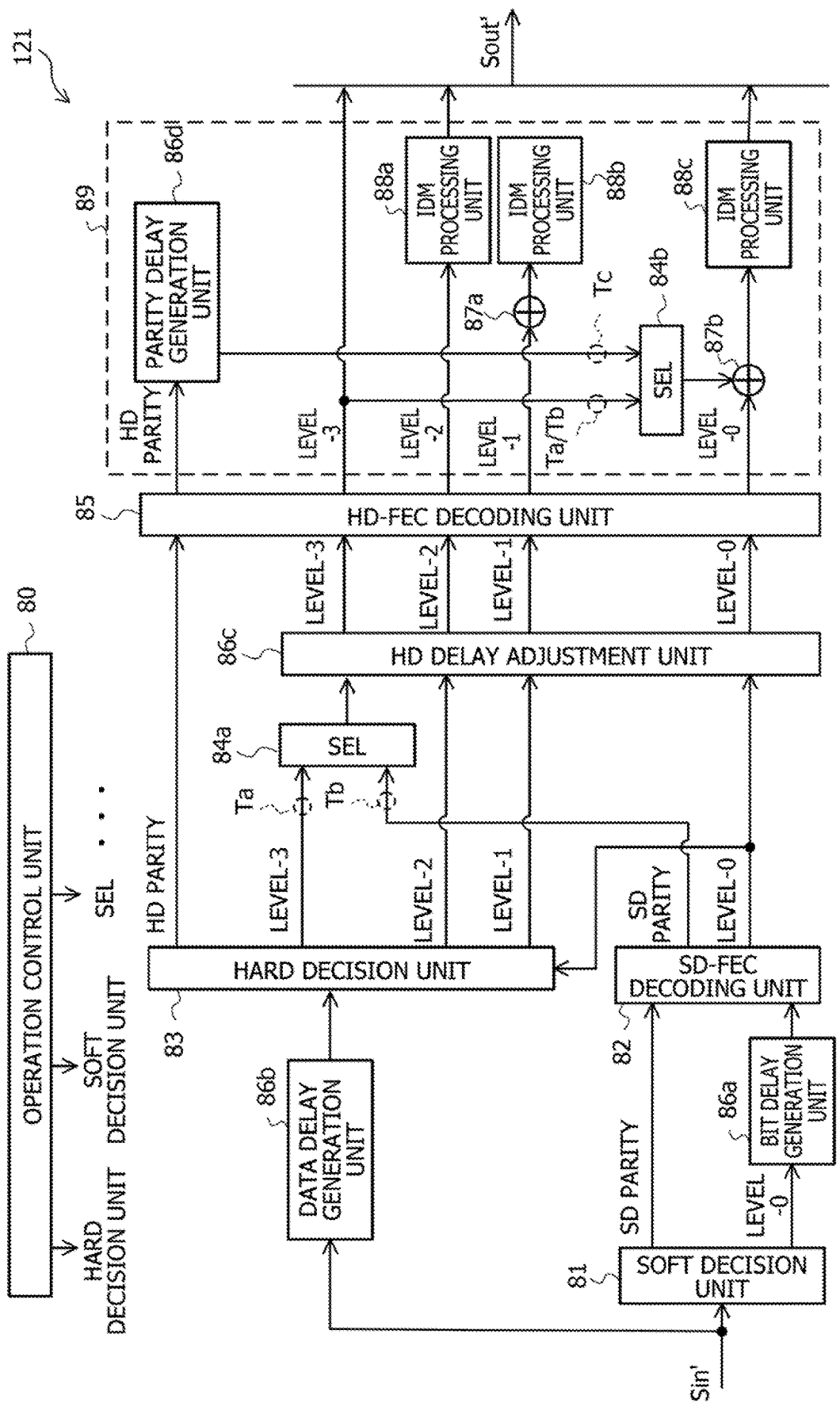
FIG. 17 is a configuration diagram illustrating a decoding circuit of the second embodiment.

FIG. 17 is a configuration diagram illustrating the decoding circuit 121 of the second embodiment. The decoding method of the embodiment is decoding processing of the decoding circuit 121 described below. This will be described below with reference to FIGS. 15 and 17.

The decoding circuit 121 includes an operation control unit 80, a soft decision unit 81, an SD-FEC decoding unit 82, a hard decision unit 83, a selector 84a, an HD-FEC decoding unit 85, a bit delay generation unit 86a, a data delay generation unit 86b, an HD delay adjustment unit 86c, and a PS inverse conversion unit 89. The PS inverse conversion unit 89 includes a selector 84b, a parity delay generation unit 86d, XOR operators 87a and 87b, and IDM processing units 88a to 88c.

The operation control unit 80 notifies the hard decision unit 83, the soft decision unit 81, and the selectors 84a and 84b of the periods Ta to Tc in accordance with frame synchronization information, for example. The selectors 84a and 84b select an input signal in accordance with notifications of the periods Ta to Tc. The hard decision unit 83 detects an SD-FEC parity from the bit string of level-2 in accordance with a notification of the period Tb, and the soft decision unit 81 detects an HD-FEC parity from the bit string of level-2 in accordance with a notification of the period Tc.

An input signal Sin∝ is input from an analog-digital conversion unit 13 to the soft decision unit 81 and the hard decision unit 83 separately. The data delay generation unit 86b that delays the input signal Sin' is provided in a stage preceding the hard decision unit 83.

The soft decision unit 81 is an example of the second decision unit, and performs soft decision on the value of the bit string of level-0 in a frame to which symbols in the constellation of 256QAM are assigned, on the basis of the symbols. At this time, the soft decision unit 81 performs symbol demapping by set-partitioning. On the basis of the result of the soft decision, the soft decision unit 81 extracts an SD-FEC parity from the bit string of level-2 in the period Ta, and outputs the SD-FEC parity to the SD-FEC decoding unit 82.

Furthermore, on the basis of the result of the soft decision, the soft decision unit 81 outputs the data #1 to data #5 in the bit string of level-0 to the SD-FEC decoding unit 82. The bit delay generation unit 86a that delays the bit string of level-0 is provided in a stage preceding the SD-FEC decoding unit 82.

The bit delay generation unit 86a is an example of the second delay unit, and delays the bit string of level-0 by the periods Ta and Tb or the periods Ta and Tc. For this reason, the bit string of level-0 is input to the SD-FEC decoding unit 82 in synchronization with the SD-FEC parity delayed by the total of the periods Ta and Tb or the total of the periods Ta and Tc in the encoding circuit 120.

The SD-FEC decoding unit 82 is an example of the second correction unit, and corrects an error in a result of the soft decision by the soft decision unit 81 on the basis of the SD-FEC parity inserted into the bit string of level-2 during the periods Ta and Tb or the periods Tb and Tc. For example, the SD-FEC decoding unit 82 decodes the bit string of level-0 on the basis of the SD-FEC parity.

The timing at which the SD-FEC parity is input to the SD-FEC decoding unit 82 is synchronized with the timing at which the bit string of level-0 is input to the SD-FEC decoding unit 82. For this reason, the SD-FEC decoding unit 82 may correct the value of the bit string of level-0 by using the SD-FEC parity in periods Ta and Tb or periods Ta and Tc that are later than periods Ta and Tb or periods Ta and Tc of the bit string of level-0. In the case of the example of FIG. 15, the data #1 in the bit string of level-0 is corrected by using the SD-FEC parity #1, and the data #2 in the bit string of level-0 is corrected by using the SD-FEC parity #2.

The bit string of level-0 is input from the SD-FEC decoding unit 82 to the hard decision unit 83 and the HD delay adjustment unit 86c. The SD-FEC parity is input from the SD-FEC decoding unit 82 to the selector 84a.

Furthermore, the hard decision unit 83 is an example of the second decision unit, and performs hard decision on the value of each of the bit strings of level-1 to level-3 among the bit strings of level-0 to level-3 to which symbols in the constellation of 256QAM are assigned, on the basis of the symbols. For example, the hard decision unit 83 is used for hard decision of the bit string of level-0 input from the SD-FEC decoding unit 82. At this time, the hard decision unit 83 performs symbol demapping by set-partitioning. The bit string of level-3 is input from the hard decision unit 83 to the selector 84a, and the bit strings of level-1 and level-2 are input from the hard decision unit 83 to the HD delay adjustment unit 86c. Furthermore, on the basis of the result of the hard decision, the hard decision unit 83 extracts an HD-FEC parity from the bit string of level-3, and outputs the HD-FEC parity to the HD-FEC decoding unit 85.

Furthermore, the data delay generation unit 86b delays each bit string input to the hard decision unit 83. The data delay generation unit 86b delays each bit string for the same amount of time as the bit delay generation unit 86a, The timing at which the bit strings of level-1 and level-2 and the HD-FEC parity are input to the hard decision unit 83 and the timing at which the bit string and the SD-FEC parity are input to the SD-FEC decoding unit 82 are therefore aligned.

The selector 84a selects an input signal from the data #30 to data #33 and the SD-FEC parity in the bit string of level-3 in accordance with controls in the periods Ta to Tc by the operation control unit 80. The selector 84a outputs the data #30 to data #33 in the bit string of level-2 to the HD delay adjustment unit 86c during the period Ta, and outputs the SD-FEC parity to the HD delay adjustment unit 86c during the period Tb.

The HD delay adjustment unit 86c, which is an example of the first delay unit, delays each of the bit strings of level-0 to level-3 by the period T of the frame, and outputs the delayed bit string to the HD-FEC decoding unit 85.

The HD-FEC decoding unit 85 is an example of the first correction unit, and corrects an error in a result of the hard decision by the hard decision unit 83 on the basis of the HD-FEC parity inserted into the bit string of level-3 for each frame. Since each of the bit strings of level-0 to level-3 is input after being delayed by the period T of the frame, the HD-FEC decoding unit 85 may correct each of the bit strings of level-0 to level-3 on the basis of the HD-FEC parity inserted into the bit string of level-3 in a subsequent frame. The HD-FEC decoding unit 85 outputs each of the bit strings of level-0 to level-3 to the PS inverse conversion unit 89.

The PS inverse conversion unit 89 is an example of the inverse conversion unit, and performs inverse conversion of the value of each of the bit strings of level-0 to level-2 converted by DM processing. The HD-FEC parity is input to the parity delay generation unit 86d, and the bit string of level-2 is inputted to the IDM processing unit 88a and the XOR operator 87a. Furthermore, the bit strings of level-1 and level-0 are input to the XOR operators 87a and 87b, respectively, and the bit string of level-3 is inputted to the selector 84b.

The parity delay generation unit 86d delays the HD-FEC parity in accordance with the period Tc within the period T of the frame, and outputs the HD-FEC parity to the selector 84b.

The selector 84b selects an input signal from the bit string of level-3 and the HD-FEC parity in accordance with controls in the periods Ta to Tc by the operation control unit 80. The selector 84b selects the bit string of level-3 and outputs it to the XOR operator 87b during the periods Ta and Tb, and selects the delayed HD-FEC parity and outputs it to the XOR operator 87b during the period Tc.

The XOR operator 87a performs XOR operation the bit string of level-1 with the bit string of level-2. The bit string of level-1 after performed XOR operation is inputted to the IDM processing unit 88b.

The XOR operator 87b performs XOR operation the bit string of level-0 with the bit string of level-3 or the HD-FEC parity from the selector 84b. Since the HD-FEC parity is input to the XOR operator 87b with a delay in accordance with the period Tc, the bit string of level-0 is normally converted to the value before performing XOR operation by the XOR operator 73b of the encoding circuit 120. The bit string of level-0 after XOR is input to the IDM processing unit 88c.

The bit string of level-3 and the bit strings of level-2, level-1, and level-0 respectively subjected to inverse-DM processing by the IDM processing units 88a to 88c are output to the framer chip 11 as an output signal Sour by parallel-serial conversion, for example.

In this way, the HD delay adjustment unit 86c delays each of the bit strings of level-0 to level-3 so that an error in a result of the hard decision of each of the bit strings of level-1 to level-3 is corrected on the basis of the HD-FEC parity inserted into the bit string of level-2 in a subsequent frame. For this reason, the delay time given to the HD-FEC parity by the HD delay generation unit 78a of the encoding circuit 120 is reduced.

Furthermore, the bit delay generation unit 86a delays the bit string of level-0 so that an error in a result of the soft decision of the bit string of level-0 is corrected on the basis of the SD-FEC parity inserted into the bit string of level-2 in periods Ta and Tb or periods Tb and Tc that are later than periods Ta and Tb or periods Tb and Tc of the bit string of level-0. For this reason, the delay time given to the SD-FEC parity by the SD delay generation unit 78b of the encoding circuit 120 is reduced.

Thus, the decoding circuit 121 may correct errors in the hard decision and the soft decision of each of the bit strings of level-0 to level-3 on the basis of the HD-FEC parity and SD-FEC parity delayed by the encoding circuit 120.

The PS inverse conversion unit 89 performs inverse conversion of the value of the bit string of level-0 delayed by the bit delay generation unit 86a and the HD delay adjustment unit 86c by using the HD-FEC parity inserted into the bit string of level-3 in a subsequent frame, and the SD-FEC parity inserted into periods Ta and Tb or periods Ta and Tc that are later than periods Ta and Tb or periods Ta and Tc of the bit string of level-3.

For this reason, the PS inverse conversion unit 89 may normally perform inverse conversion of the bit string of level-0 using the HD-FEC parity and SD-FEC parity delayed by the encoding circuit 120.

Thus, the decoding circuit 121 may decode a bit string on the basis of encoding by the encoding circuit 120, thereby reducing power consumption without reducing noise tolerance.

Third Embodiment

Figure 18:
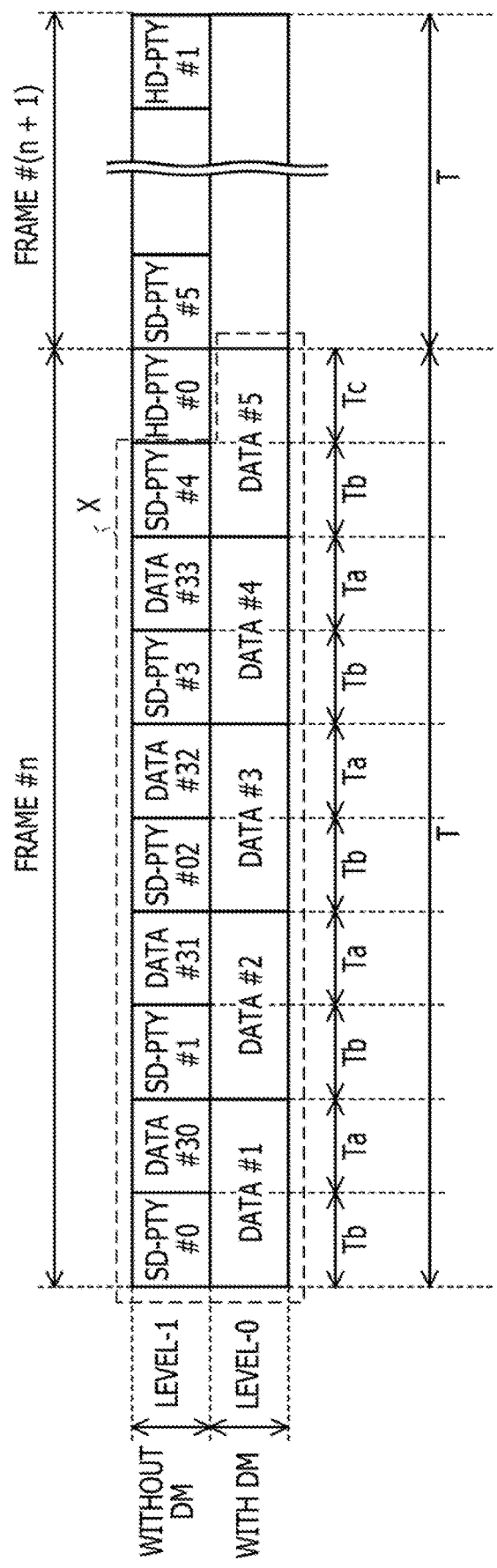
FIG. 18 is a diagram illustrating a frame format of an output signal output from an encoding circuit of a third embodiment.

FIG. 18 is a diagram illustrating example of a frame format of an output signal Sout output from an encoding circuit 120 of a third embodiment. In the present embodiment, a case where 16QAM is used as a multi-level modulation scheme will be described. In this case, a frame includes bit strings of level-0 and level-1. Note that, in FIG. 18, the same components as those in FIG. 12 are denoted by the same reference numerals, and description thereof will be omitted.

The bit string of level-1 in frame #n includes data #30 to data #33 not subject to DM processing, SD-FEC parities (SD-PTY) #0 to #4, and an HD-FEC parity (HD-PTY) #0, The SD-FEC parities #0 to #4 are each inserted into the bit string in a period Tb, and the data #30 to data #33 are each included in the bit string in a period Ta. Furthermore, the HD-PTY #0 is inserted into the bit string in a period Tc at the end.

In comparison with the frame format of the first embodiment, the frame format of the present embodiment does not have a bit string including data #10 on which DM processing has been performed, but has the same configuration for other levels, that is, level-0 and level-1. For this reason, according to the frame format of the present embodiment, an effect similar to that of the frame format of the first embodiment may be obtained.

Figure 19:
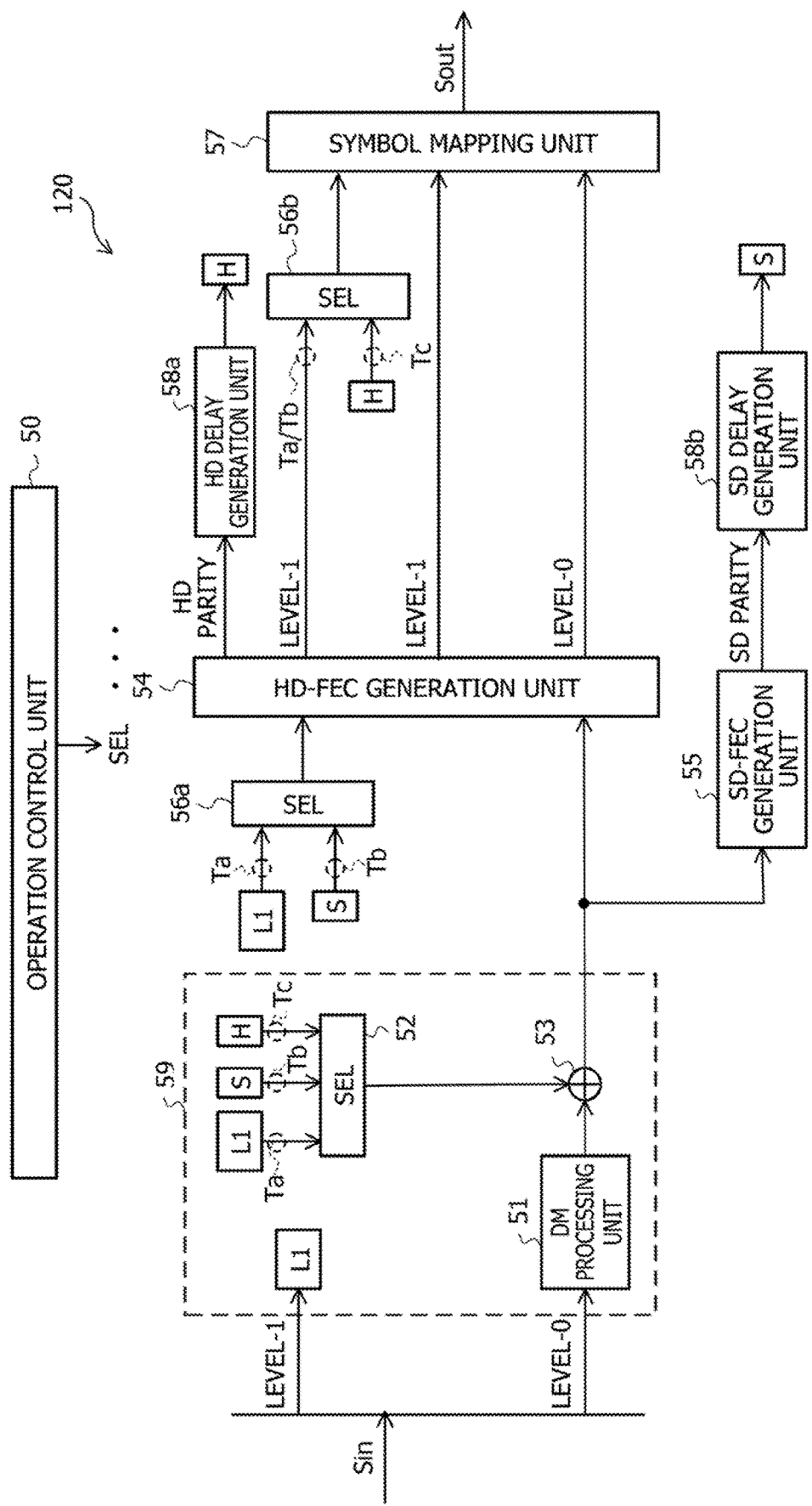
FIG. 19 is a configuration diagram illustrating the encoding circuit of the third embodiment.

FIG. 19 is a configuration diagram illustrating the encoding circuit 120 of the third embodiment. The encoding method of the embodiment is encoding processing of the encoding circuit 120 described below. This will be described below with reference to FIGS. 18 and 19.

The encoding circuit 120 includes an operation control unit 50, a PS conversion unit 59, an HD-FEC generation unit 54, an SD-FEC generation unit 55, a symbol mapping unit 57, selectors (SELs) 56a and 56b, an HD delay generation unit 58a, and an SD delay generation unit 58b. The PS conversion unit 59 includes a DM processing unit 51, a selector (SEL) 52, and an XOR operator 53.

Each of the bit strings of level-0 and level-1 is input to the PS conversion unit 59. The PS conversion unit 59 is an example of the conversion unit, and converts the value of the bit string of level-0 other than level-1 so that a symbol closer to the center of a constellation is assigned more. The data #30 to data #33 in the bit string of level-1 are input to the selectors 52 and 56a.

The bit string of level-0 is inputted to the DM processing unit 51. The DM processing unit 51 performs DM processing similarly to the DM processing units 21a and 21b. The bit string of level-0 on which DM processing has been performed is inputted to the XOR operator 53.

The XOR operator 53 performs an XOR operation on the bit string of level-0 output from the DM processing unit 51 and data selected by the selector 52. The bit string of level-0 after performing XOR operation is input to the HD-FEC generation unit 54 and the SD-FEC generation unit 55.

The data #30 to data #33, an SD-FEC parity, and an HD-FEC parity in the bit string of level-1 are inputted to the selector 52. The selector 52 selects, as an input signal, any one of the data #30 to data #33, the SD-FEC parity, or the FID-FEC parity in the bit string of level-1 in accordance with the periods Ta to Tc controlled by the operation control unit 50.

The selector 52 selects the data #30 to data #33 in the bit string of level-1 during the period Ta, the SD-FEC parity during the period Tb, and the HD-FEC parity during the period Tc. The selected input signal is inputted to the XOR operator 53. For this reason, the SD-FEC parity, the HD-FEC parity, and the data #30 to data #33 in the bit string of level-1 are used for the XOR operation in accordance with the periods Ta to Tc.

The SD-FEC generation unit 55 is an example of the second generation unit, and generates an SD-FEC parity from the bit string of level-0 in the periods Ta and Tb or the periods Tb and Tc. The SD-FEC generation unit 55 calculates an SD-FEC parity from the data #1 to data #4 of level-0 in the periods Ta and Tb or the data #5 in the periods Tb and Tc and outputs the SD-FEC parity to the SD delay generation unit 58b.

The SD delay generation unit 58b, which is an example of the second insertion unit, delays an SD-FEC parity, and inserts the SD-FEC parity into the bit string of level-1 in periods Ta and Tb or periods Tb and Tc that are later than periods Ta and Tb or periods Tb and Tc of the bit string of level-0 used to generate the SD-FEC parity. The SD delay generation unit 58b delays an SD-FEC parity input from the SD-FEC generation unit 55 once every pair of periods Ta and Tb or every pair of periods Tb and Tc by the total of the periods Ta and Tb or the total of the periods Tb and Tc, and outputs the SD-FEC parity to the selectors 52 and 56a.

The data #30 to data #33 and the SD-FEC parity in the bit string of level-1 are input to the selector 56a. The selector 56a selects, as an input signal, any one of the data #30 to data #33 or the SD-FEC parity in the bit string of level-1 in accordance with the periods Ta and Tb controlled by the operation control unit 50. The selector 56a selects the data #30 to data #33 in the bit string of level-1 and outputs it to the HD-FEC generation unit 54 during the period Ta, and selects the SD-FEC parity and outputs it to the HD-FEC generation unit 54 during the period Tb.

The HD-FEC generation unit 54 is an example of the first generation unit, and generates an HD-FEC parity from the bit strings of level-0 and level-1 for each frame. The bit string of level-1 alternately includes data #30 to data #33 and SD-FEC parities. By switching of the selector 56a, the HD-FEC generation unit 54 generates an HD-FEC parity from the data #30 to data #33 during the period Ta, and generates an HD-FEC parity from the SD-FEC parities during the period Tb.

The HD-FEC generation unit 54 calculates an HD-FEC parity from values of the bit strings of level-0 and level-1 for each frame and outputs the HD-FEC parity to the HD delay generation unit 58a, Note that, during the period Tc, the HD-FEC generation unit 54 receives no input of the bit string of level-1 from the selector 56a, and generates an HD-FEC parity from the bit string of another level, that is, level-0.

The HD delay generation unit 58a, which is an example of the first insertion unit, delays an HD-FEC parity, and inserts the HD-FEC parity into the bit string of level-1 in a frame subsequent to a frame including the bit string used to generate the HD-FEC parity. The HD delay generation unit 58a delays the HD-FEC parity by a period T of a frame, and outputs the HD-FEC parity to the selectors 52 and 56b.

The HD-FEC generation unit 54 outputs, to the symbol mapping unit 57, the bit string of level-0 input from the DM processing unit 51 as it is. Furthermore, the HD-FEC generation unit 54 outputs, to the selector 56b, the data #30 to data #33 or the SD-FEC parity in the bit string of level-1 input from the selector 56a as it is.

The selector 56b selects an input signal in accordance with controls in the periods Ta to Tc by the operation control unit 50. The selector 56b selects the data #30 to data #33 or the SD-FEC parity in the bit string of level-1 during the periods Ta and Tb, and selects the HD-FEC parity during the period Tc. The selector 56b outputs the selected input signal as a bit string of level-1 to the symbol mapping unit 57.

The symbol mapping unit 57 is an example of the assigning unit, and assigns, to the bit strings of level-0 and level-1, symbols corresponding to the values of the bit strings of level-0 and level-1, the symbols being among a plurality of symbols in a constellation of 16QAM. The symbol mapping unit 57 performs symbol mapping by set-partitioning. The symbol mapping unit 57 outputs each of the bit strings of level-0 and level-1 as an output signal Sout.

Furthermore, to the selector 52, the HD-FEC parity is input from the HD delay generation unit 58a, and the SD-FEC parity is input from the SD delay generation unit 58b. For this reason, the delayed HD-FEC parity and SD-FEC parity are used in the XOR operator 53.

The PS conversion unit 59 is therefore able to convert the bit string of level-0 using the HD-FEC parity and the SD-FEC parity determined by the HD-FEC generation unit 54 and the SD-FEC generation unit 55, respectively, in stages following the PS conversion unit 59. Thus, the probability distribution of symbol assignment is formed normally.

In this way, the symbol mapping unit 57 assigns, to the bit strings of level-0 and level-1, symbols corresponding to the values of the bit strings of level-0 and level-1, the symbols being among the plurality of symbols in the constellation of 16QAM. The PS conversion unit 59 converts the value of the bit string of level-0 other than the bit string of level-1 so that a symbol closer to the center of the constellation is assigned more.

The HD-FEC generation unit 54 generates an HD-FEC parity from the bit strings of level-0 and level-1 for each frame. The HD delay generation unit 58a delays an HD-FEC parity, and inserts the HD-FEC parity into the bit string of level-1 in a frame subsequent to a frame including the bit string used to generate the HD-FEC parity.

The SD-FEC generation unit 55 generates an SD-FEC parity from the bit string of level-0 in the periods Ta and Tb or the periods Tb and Tc. The SD delay generation unit 58b delays an SD-FEC parity, and inserts the SD-FEC parity into the bit string of level-1 in periods Ta and Tb or periods Tb and Tc that are later than periods Ta and Tb or periods Tb and Tc of the bit string of level-0 used to generate the SD-FEC parity.

Furthermore, the PS conversion unit 59 uses the delayed SD-FEC parity and HD-FEC parity for converting the value of the bit string of level-0.

In comparison with the configuration of the first embodiment, the configuration described above is the same except for a difference due to the addition of the bit string of data #10 on which DM processing has been performed. Thus, according to the encoding circuit 120 of the present embodiment, it is possible to reduce power consumption without reducing noise tolerance.

Figure 20:
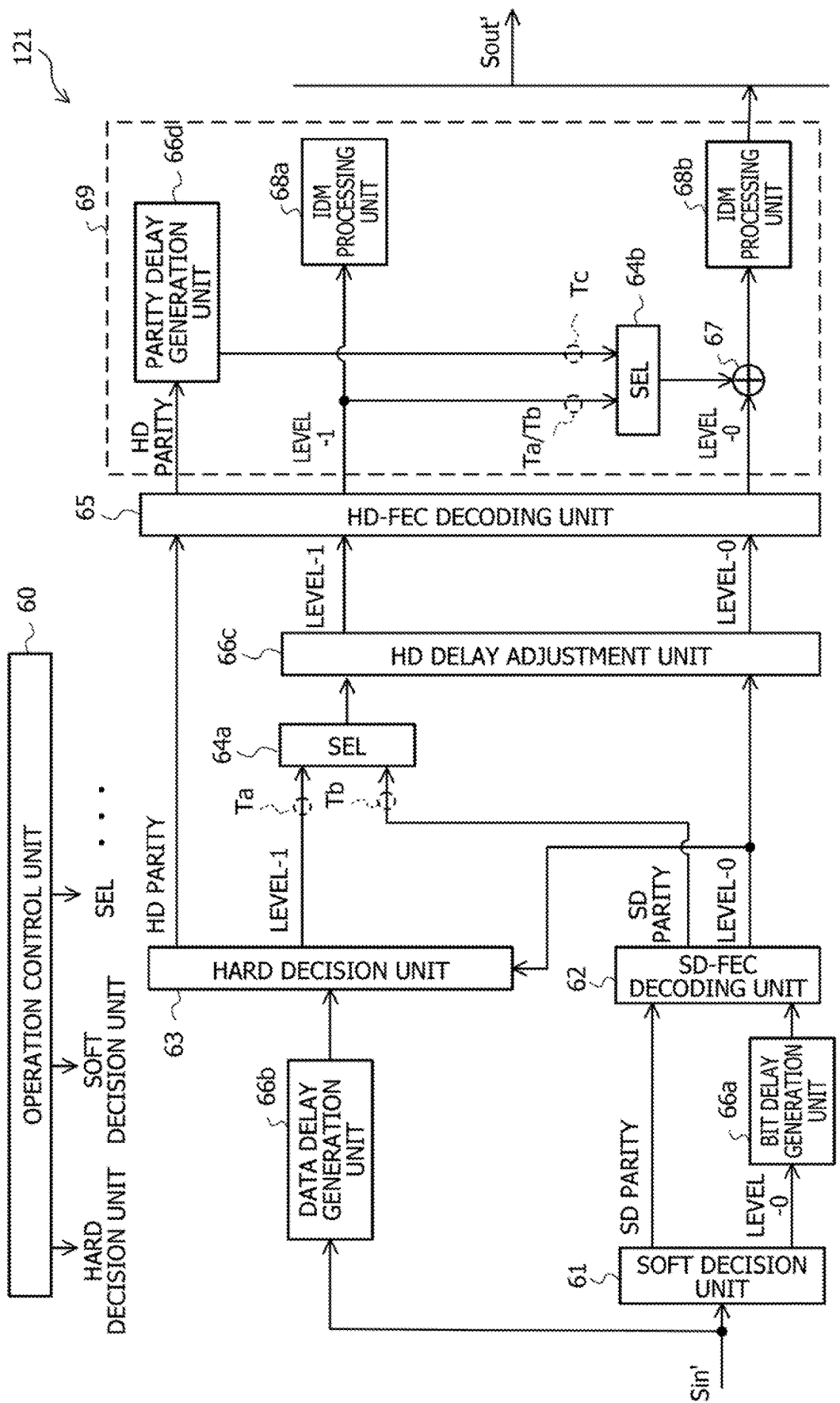
FIG. 20 is a configuration diagram illustrating a decoding circuit of the third embodiment.

FIG. 20 is a configuration diagram illustrating a decoding circuit 121 of the third embodiment. The decoding method of the embodiment is decoding processing of the decoding circuit 121 described below. This will be described below with reference to FIGS. 18 and 20.

The decoding circuit 121 includes an operation control unit 60, a soft decision unit 61, an SD-FEC decoding unit 62, a hard decision unit 63, a selector 64a, an HD-FEC decoding unit 65, a bit delay generation unit 66a, a data delay generation unit 66b, an HD delay adjustment unit 66c, and a PS inverse conversion unit 69. The PS inverse conversion unit 69 includes a selector 64b, a parity delay generation unit 66d, an XOR operator 67, and IDM processing units 68a and 68b.

The operation control unit 60 notifies the hard decision unit 63, the soft decision unit 61, and the selectors 64a and 64b of the periods Ta to Tc in accordance with frame synchronization information, for example. The selectors 64a and 64b select an input signal in accordance with notifications of the periods Ta to Tc. The hard decision unit 63 detects an SD-FEC parity from the bit string of level-1 in accordance with a notification of the period Tb, and the soft decision unit 61 detects an HD-FEC parity from the bit string of level-1 in accordance with a notification of the period Tc.

An input signal Sin' is input from an analog-digital conversion unit 13 to the soft decision unit 61 and the hard decision unit 63 separately. The data delay generation unit 66b that delays the input signal Sin' is provided in a stage preceding the hard decision unit 63.

The soft decision unit 61 is an example of the second decision unit, and performs soft decision on the value of the bit string of level-0 in a frame to which symbols in the constellation of 16QAM are assigned, on the basis of the symbols. At this time, the soft decision unit 61 performs symbol demapping by set-partitioning. On the basis of the result of the soft decision, the soft decision unit 61 extracts an SD-FEC parity from the bit string of level-2 in the period Ta, and outputs the SD-FEC parity to the SD-FEC decoding unit 62.

Furthermore, on the basis of the result of the soft decision, the soft decision unit 61 outputs the data #1 to data #5 in the bit string of level-0 to the SD-FEC decoding unit 62. The bit delay generation unit 66a that delays the bit string of level-0 is provided in a stage preceding the SD-FEC decoding unit 62.

The bit delay generation unit 66a is an example of the second delay unit, and delays the bit string of level-0 by the periods Ta and Tb or the periods Ta and Tc. For this reason, the bit string of level-0 is inputted to the SD-FEC decoding unit 62 in synchronization with the SD-FEC parity delayed by the total of the periods Ta and Tb or the total of the periods Ta and Tc in the encoding circuit 120.

The SD-FEC decoding unit 62 is an example of the second correction unit, and corrects an error in a result of the soft decision by the soft decision unit 61 on the basis of the SD-FEC parity inserted into the bit string of level-2 during the periods Ta and Tb or the periods Tb and Tc. For example, the SD-FEC decoding unit 62 decodes the bit string of level-0 on the basis of the SD-FEC parity.

The timing at which the SD-FEC parity is input to the SD-FEC decoding unit 62 is synchronized with the timing at which the bit string of level-0 is input to the SD-FEC decoding unit 62. For this reason, the SD-FEC decoding unit 62 may correct the value of the bit string of level-0 by using the SD-FEC parity in periods Ta and Tb or periods Ta and Tc that are later than periods Ta and Tb or periods Ta and Tc of the bit string of level-0. In the case of the example of FIG. 18, the data #1 in the bit string of level-0 is corrected by using the SD-FEC parity #1, and the data #2 in the bit string of level-0 is corrected by using the SD-FEC parity #2.

The bit string of level-0 is input from the SD-FEC decoding unit 62 to the hard decision unit 63 and the HD delay adjustment unit 66c. The SD-FEC parity is input from the SD-FEC decoding unit 62 to the selector 64a.

Furthermore, the hard decision unit 63 is an example of the second decision unit, and performs hard decision on the value of the bit string of level-1 among the bit strings of level-0 to level-3 to which symbols in the constellation of 16QAM are assigned, on the basis of the symbols. For example, the hard decision unit 63 is used for hard decision of the bit string of level-0 input from the SD-FEC decoding unit 62. At this time, the hard decision unit 63 performs symbol demapping by set-partitioning. The bit string of level-1 is inputted from the hard decision unit 63 to the selector 64a, and the bit string of level-1 is input from the hard decision unit 63 to the HD delay adjustment unit 66c. Furthermore, on the basis of the result of the hard decision, the hard decision unit 63 extracts an HD-FEC parity from the bit string of level-1, and outputs the HD-FEC parity to the HD-FEC decoding unit 65.

Furthermore, the data delay generation unit 66b delays each bit string input to the hard decision unit 63. The data delay generation unit 66b delays each bit string for the same amount of time as the bit delay generation unit 66a. The timing at which the bit string of level-1 and the HD-FEC parity are input to the hard decision unit 63 and the timing at which the bit string and the SD-FEC parity are input to the SD-FEC decoding unit 62 are therefore aligned.

The selector 64a selects an input signal from the data #30 to data #33 and the SD-FEC parity in the bit string of level-3 in accordance with controls in the periods Ta to Tc by the operation control unit 60. The selector 64a outputs the data #30 to data #33 in the bit string of level-2 to the HD delay adjustment unit 66c during the period Ta, and outputs the SD-FEC parity to the HD delay adjustment unit 66c during the period Tb.

The HD delay adjustment unit 66c, which is an example of the first delay unit, delays each of the bit strings of level-0 and level-1 by the period T of the frame, and outputs the delayed bit string to the HD-FEC decoding unit 65.

The HD-FEC decoding unit 65 is an example of the first correction unit, and corrects an error in a result of the hard decision by the hard decision unit 63 on the basis of the HD-FEC parity inserted into the bit string of level-1 for each frame. Since each of the bit strings of level-0 and level-1 is input after being delayed by the period T of the frame, the HD-FEC decoding unit 65 may correct each of the bit strings of level-0 to level-3 on the basis of the HD-FEC parity inserted into the bit string of level-1 in a subsequent frame. The HD-FEC decoding unit 65 outputs each of the bit strings of level-0 and level-1 to the PS inverse conversion unit 69.

The PS inverse conversion unit 69 is an example of the inverse conversion unit, and performs inverse conversion of the value of each of the bit strings of level-0 and level-1 converted by DM processing. The FID-FEC parity is input to the parity delay generation unit 66d, and the bit string of level-1 is input to the IDM processing unit 68a and the selector 64b. Furthermore, the bit string of level-0 is input to the XOR operator 67.

The parity delay generation unit 66d delays the HD-FEC parity in accordance with the period Tc within the period T of the frame, and outputs the HD-FEC parity to the selector 64b.

The selector 64b selects an input signal from the bit string of level-1 and the HD-FEC parity in accordance with controls in the periods Ta to Tc by the operation control unit 60. The selector 64b selects the bit string of level-1 and outputs it to the XOR operator 67 during the periods Ta and Tb, and selects the delayed HD-FEC parity and outputs it to the XOR operator 67 during the period Tc.

The XOR operator 67 performs XOR operation the bit string of level-0 with the bit string of level-1 or the HD-FEC parity from the selector 64b. Since the HD-FEC parity is input to the XOR operator 67 with a delay in accordance with the period Tc, the bit string of level-0 is normally converted to the value before XOR by the XOR operator 53 of the encoding circuit 120. The bit string of level-0 after performing XOR operation is inputted to the IDM processing unit 68b.

The bit strings of level-1 and level-0 subjected to inverse-DM processing by the IDM processing units 68a and 68b, respectively, are output to the framer chip 11 as an output signal Sout by parallel-serial conversion, for example.

In this way, the HD delay adjustment unit 66c delays each of the bit strings of level-0 and level-1 so that an error in a result of the hard decision of the bit string of level-1 is corrected on the basis of the HD-FEC parity inserted into the bit string of level-1 in a subsequent frame. For this reason, the delay time given to the HD-FEC parity by the HD delay generation unit 58a of the encoding circuit 120 is reduced.

Furthermore, the bit delay generation unit 66a delays the bit string of level-0 so that an error in a result of the soft decision of the bit string of level-0 is corrected on the basis of the SD-FEC parity inserted into the bit string of level-1 in periods Ta and Tb or periods Tb and Tc that are later than periods Ta and Tb or periods Tb and Tc of the bit string of level-0. For this reason, the delay time given to the SD-FEC parity by the SD delay generation unit 58b of the encoding circuit 120 is reduced.

Thus, the decoding circuit 121 may correct errors in the hard decision and the soft decision of each of the bit strings of level-0 and level-1 on the basis of the HD-FEC parity and SD-FEC parity delayed by the encoding circuit 120.

The PS inverse conversion unit 69 performs inverse conversion of the value of the bit string of level-0 delayed by the bit delay generation unit 66a and the HD delay adjustment unit 66c by using the HD-FEC parity inserted into the bit string of level-1 in a subsequent frame, and the SD-FEC parity inserted into periods Ta and Tb or periods Ta and Tc that are later than periods Ta and Tb or periods Ta and Tc of the bit string of level-1.

For this reason, the PS inverse conversion unit 69 may normally perform inverse conversion of the bit string of level-0 using the HD-FEC parity and SD-FEC parity delayed by the encoding circuit 120.

Thus, the decoding circuit 121 may decode a bit string on the basis of encoding by the encoding circuit 120, thereby reducing power consumption without reducing noise tolerance.

In the encoding circuit 120 of the first to third embodiments, the HD delay generation units 28a, 78a, and 58a delay an HD-FEC parity, and insert the HD-FEC parity into the bit string of the most significant level in a frame next to a frame including the bit string used to generate the HD-FEC parity.

For this reason, the HD delay generation units 28a, 78a, and 58a just have to retain an HD-FEC parity for one frame, and this enables minimization of the capacity of a memory for storing the HD-FEC parity, for example. Note that the HD delay generation units 28a, 78a, and 58a are not limited to this, and may insert the HD-FEC parity into any one of subsequent frames. In this case, a capacity for storing HD-FEC parities for the number of frames corresponding to the amount of delay is desired.

Furthermore, in the encoding circuit 120 of the first to third embodiments, the SD delay generation units 28b, 78b, and 58b delay an SD-FEC parity, and insert the SD-FEC parity into the bit string of the most significant level in periods Ta and Tb or periods Ta and Tc that are next to periods Ta and Tb or periods Ta and Tc during which the SD-FEC parity has been generated.

For this reason, the SD delay generation units 28b, 78b, and 58b just have to retain SD-FEC parities for the total of the periods Ta and Tb or the total of the periods Ta and Tc, and this enables minimization of the capacity of a memory for storing the SD-FEC parities, for example. Note that the SD delay generation units 28b, 78b, and 58b are not limited to this, and may insert the SD-FEC parity into the bit string of periods Ta and Tb or periods Ta and Tc that are later than periods Ta and Tb or periods Ta and Tc of the bit string used to generate the SD-FEC parity. In this case, a capacity for storing SD-FEC parities for the periods corresponding to the amount of delay is desired.

Furthermore, the transponders 1a and 1b and the optical transmission system of the present embodiment include the encoding circuit 120 and the decoding circuit 121 of the first to third embodiments. For this reason, operational effects similar to those described above may be obtained. Note that, the encoding circuit 120 and the decoding circuit 121 described above may be, for example, circuits including hardware such as a field programmable gate array (FPGA) or an application specified integrated circuit (ASIC).

The embodiments described above are preferred examples. However, the embodiments are not limited to this, and a variety of modifications may be made without departing from the scope of the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical communication system comprising:
a first communication device configured to transmit optical signals; and
a second communication device configured to receive the optical signals,
wherein the first communication device includes an encoding circuit configured to:
assign, to a plurality of bit strings, symbols each corresponding to a value of every one of the plurality of bit strings, the symbols being among a plurality of symbols in a constellation of a multi-level modulation scheme,
convert values of bit strings that are among the plurality of bit strings and other than a first bit string to cause to be assigned more to a first symbol among the plurality of symbols than to a second symbol among the plurality of symbols, the first symbol being closer distance to a center of the constellation than the second symbol,
generate a first error correction code from the plurality of bit strings for each of frames including a first frame,
generate a second error correction code from a second bit string among the plurality of bit strings in every one of a plurality of periods that divide a period of a frame included in the frames,
delay the first error correction code and insert the first error correction code into the first bit string in a second frame subsequent to the first frame, and
delay the second error correction code and insert the second error correction code into the first bit string in a period that is later than a period of the second bit string used to generate the second error correction code, the periods being among the plurality of periods, wherein
the encoding circuit uses the delayed first error correction code and the delayed second error correction code to convert a value of the second bit string.

2. The optical communication system according to claim 1, wherein the second communication device includes a decoding circuit, the decoding circuit configured to:
perform hard decision on a value of the first bit string among the plurality of bit strings in the frames to each of which one of the plurality of symbols in the constellation of the multi-level modulation scheme is assigned, based on one of the symbols,
correct an error in a result of the hard decision based on the first error correction code inserted into the first bit string for each of the frames,
perform soft decision on a value of the second bit string among the plurality of bit strings based on one of the symbols,
correct an error in a result of the soft decision based on the second error correction code inserted into the first bit string in every one of the plurality of periods that divide the frame,
delay the plurality of bit strings to cause the error in the result of the hard decision on the first bit string to be corrected based on the first error correction code inserted into the first bit string in the second frame,
delay the second bit string to cause the error in the result of the soft decision on the second bit string to be corrected based on the second error correction code inserted into the first bit string in a period that is later than a period of the second bit string among the plurality of periods,
perform inverse conversion on the value of the second bit string that has been converted to cause to be assigned more to the first symbol among the plurality of symbols than to the second symbol among the plurality of symbols, the first symbol being closer distance to the center of the constellation than the second symbol, and
use the first error correction code inserted into the first bit string in the second frame subsequent to the first frame and the second error correction code inserted into the first bit string in the period that is later than the period of the second bit string, the periods being among the plurality of periods, to perform inverse conversion on the value of the second bit string which have been delayed.

3. The optical communication system according to claim 1, wherein
the first error correction code is used for correction of an error in a result of hard decision on the plurality of bit strings in the frames, and the second error correction code is used for correction of an error in a result of soft decision on the plurality of bit strings.

4. A communication device comprising:
an encoding circuit configured to encode frames to be transmitted; and
a transmitter configured to transmit to another device an optical signal that having been encoded the frames, wherein the encoding circuit is further configured to:
assign, to a plurality of bit strings, symbols each corresponding to a value of every one of the plurality of bit strings, the symbols being among a plurality of symbols in a constellation of a multi-level modulation scheme,
convert values of bit strings that are among the plurality of bit strings and other than a first bit string to cause to be assigned more to a first symbol among the plurality of symbols than to a second symbol among the plurality of symbols, the first symbol being closer distance to a center of the constellation than the second symbol,
generate a first error correction code from the plurality of bit strings for each of frames including a first frame,
generate a second error correction code from a second bit string among the plurality of bit strings in every one of a plurality of periods that divide a period of a frame included in the plurality of frames,
delay the first error correction code and insert the first error correction code into the first bit string in a second frame subsequent to the first frame, and
delay the second error correction code and insert the second error correction code into the first bit string in a period that is later than a period of the second bit string used to generate the second error correction code, the periods being among the plurality of periods, wherein
the encoding circuit uses the delayed first error correction code and the delayed second error correction code to convert a value of the second bit string.

5. The communication device according to claim 4, wherein the first error correction code is used for correction of an error in a result of hard decision on the plurality of bit strings in the frames, and the second error correction code is used for correction of an error in a result of soft decision on the plurality of bit strings.

6. The communication apparatus according to claim 4, wherein the encoding circuit delays the first error correction code and inserts the first error correction code into the first bit string in the second frame next to the first frame.

7. The communication apparatus according to claim 4, wherein the encoding circuit delays the second error correction code and inserts the second error correction code into the first bit string in a period next to a period in which the second error correction code has been generated, the periods being among the plurality of periods.

8. A communication apparatus comprising:
a receiver configured to receive from another device an optical signal that having been frames which is encoded by the another device; and
a decoding circuit configured to:
perform hard decision on a value of a first bit string among a plurality of bit strings in the frames to each of which one of a plurality of symbols in a constellation of a multi-level modulation scheme is assigned, based on one of the symbols,
correct an error in a result of the hard decision based on a first error correction code inserted into the first bit string for each of the frames,
perform soft decision on a value of a second bit string among the plurality of bit strings based on one of the symbols,
correct an error in a result of the soft decision based on a second error correction code inserted into the first bit string in every one of a plurality of periods that divide a frame included in the frames,
delay the plurality of bit strings to cause the error in the result of the hard decision on the first bit string to be corrected based on the first error correction code inserted into the first bit string in a second frame subsequent to a first frame which is performed the hard decision and included in the frames,
delay the second bit string to cause the error in the result of the soft decision on the second bit string to be corrected based on the second error correction code inserted into the first bit string in a period that is later than a period of the second bit string among the plurality of periods,
perform inverse conversion on the value of the second bit string, the value of the second bit string being converted by the another device to cause to be assigned more to a first symbol among the plurality of symbols than to a second symbol among the plurality of symbols, the first symbol being closer distance to a center of the constellation than the second symbol, and
use the first error correction code inserted into the first bit string in the second frame subsequent to the first frame and the second error correction code inserted into the first bit string in the period that is later than the period of the second bit string, the periods being among the plurality of periods, to perform inverse conversion on the value of the second bit string which have been delayed.

* * * * *